(12) United States Patent
Smith

(10) Patent No.: US 10,713,379 B2
(45) Date of Patent: Jul. 14, 2020

(54) DISTRIBUTED STORAGE SYSTEM FOR LONG TERM DATA STORAGE

(71) Applicant: David Lane Smith, Montgomery, TX (US)

(72) Inventor: David Lane Smith, Montgomery, TX (US)

(*) Notice: Subject to any disclaimer, the term of this patent is extended or adjusted under 35 U.S.C. 154(b) by 127 days.

(21) Appl. No.: 16/120,435

(22) Filed: Sep. 3, 2018

(65) Prior Publication Data

US 2018/0373887 A1    Dec. 27, 2018

Related U.S. Application Data

(63) Continuation-in-part of application No. 14/692,699, filed on Apr. 21, 2015, now Pat. No. 10,069,914.

(60) Provisional application No. 61/982,261, filed on Apr. 21, 2014.

(51) Int. Cl.
| | |
|---|---|
| *G06F 21/62* | (2013.01) |
| *H04L 29/08* | (2006.01) |
| *H04L 29/06* | (2006.01) |
| *G06F 3/06* | (2006.01) |

(52) U.S. Cl.
CPC ........ *G06F 21/6227* (2013.01); *G06F 3/0605* (2013.01); *G06F 3/067* (2013.01); *G06F 3/0623* (2013.01); *G06F 3/0634* (2013.01); *G06F 3/0661* (2013.01); *H04L 63/0428* (2013.01); *H04L 63/08* (2013.01); *H04L 63/0823* (2013.01); *H04L 67/1097* (2013.01)

(58) Field of Classification Search
CPC .. G06F 21/6227; G06F 3/0623; G06F 3/0661; G06F 3/067; H04L 63/0428; H04L 63/08; H04L 63/0823; H04L 67/1097
USPC ........................................................ 709/213
See application file for complete search history.

(56) References Cited

U.S. PATENT DOCUMENTS

| | | | | |
|---|---|---|---|---|
| 8,429,207 | B2* | 4/2013 | Kerns | G06F 16/113 707/812 |
| 8,849,955 | B2* | 9/2014 | Prahlad | G06F 3/0649 709/219 |
| 2013/0275543 | A1* | 10/2013 | Jain | G06F 15/167 709/213 |
| 2014/0215574 | A1* | 7/2014 | Erb | H04L 63/10 726/4 |
| 2015/0032838 | A1* | 1/2015 | Demsey | H04L 67/2842 709/213 |

* cited by examiner

*Primary Examiner* — Sheree N Brown

(57) ABSTRACT

A distributed storage system for the long-term storage of data objects that is implemented utilizing one or more distinct storage sites that may be comprised of system controllers and object storage systems that act in concert to embody a single distributed storage system. A system may include a one or more types and/or instances of object storage systems. A system may include witness functionality in which a trusted user and/or client acts to maintain consistent storage policies on behalf of one or more users and/or clients. A system may further include system controllers associated with logical and/or physical sites that coordinate object, user, device, and system management functionally.

26 Claims, 7 Drawing Sheets

Distributed Storage System

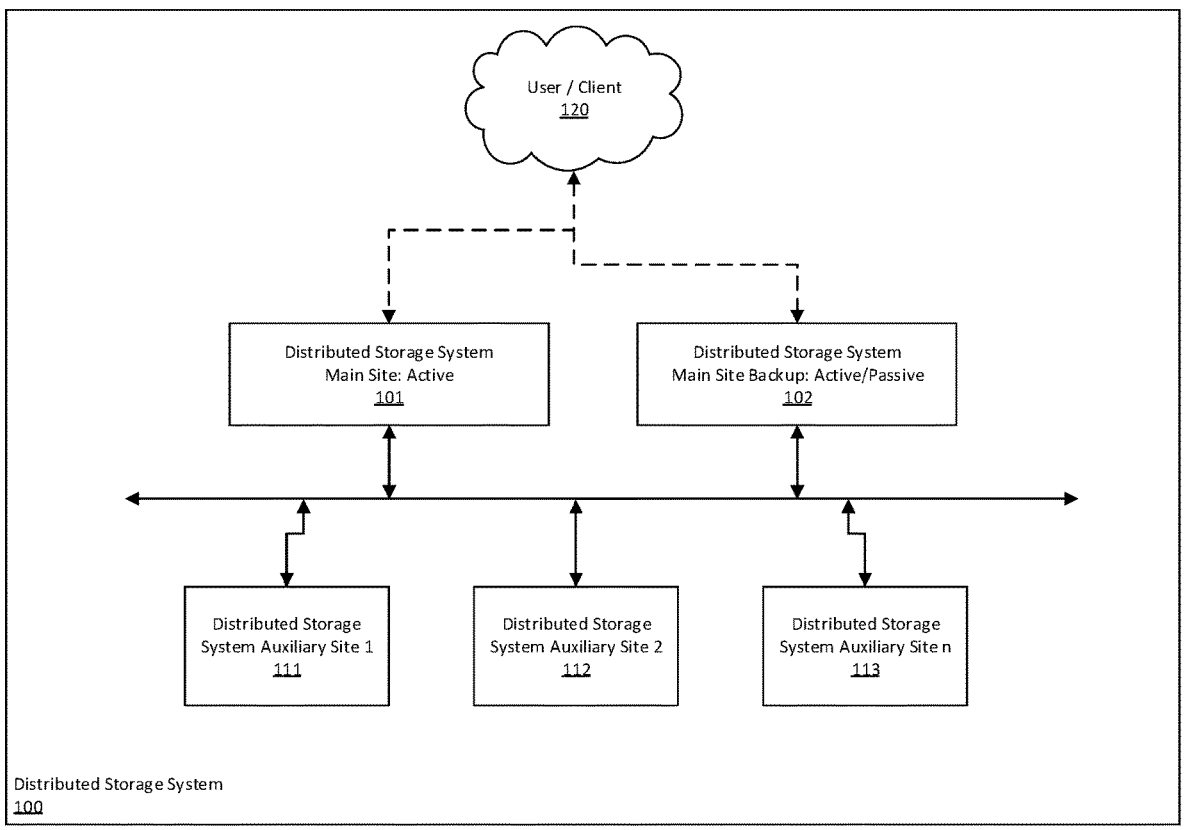
Figure 1: Distributed Storage System

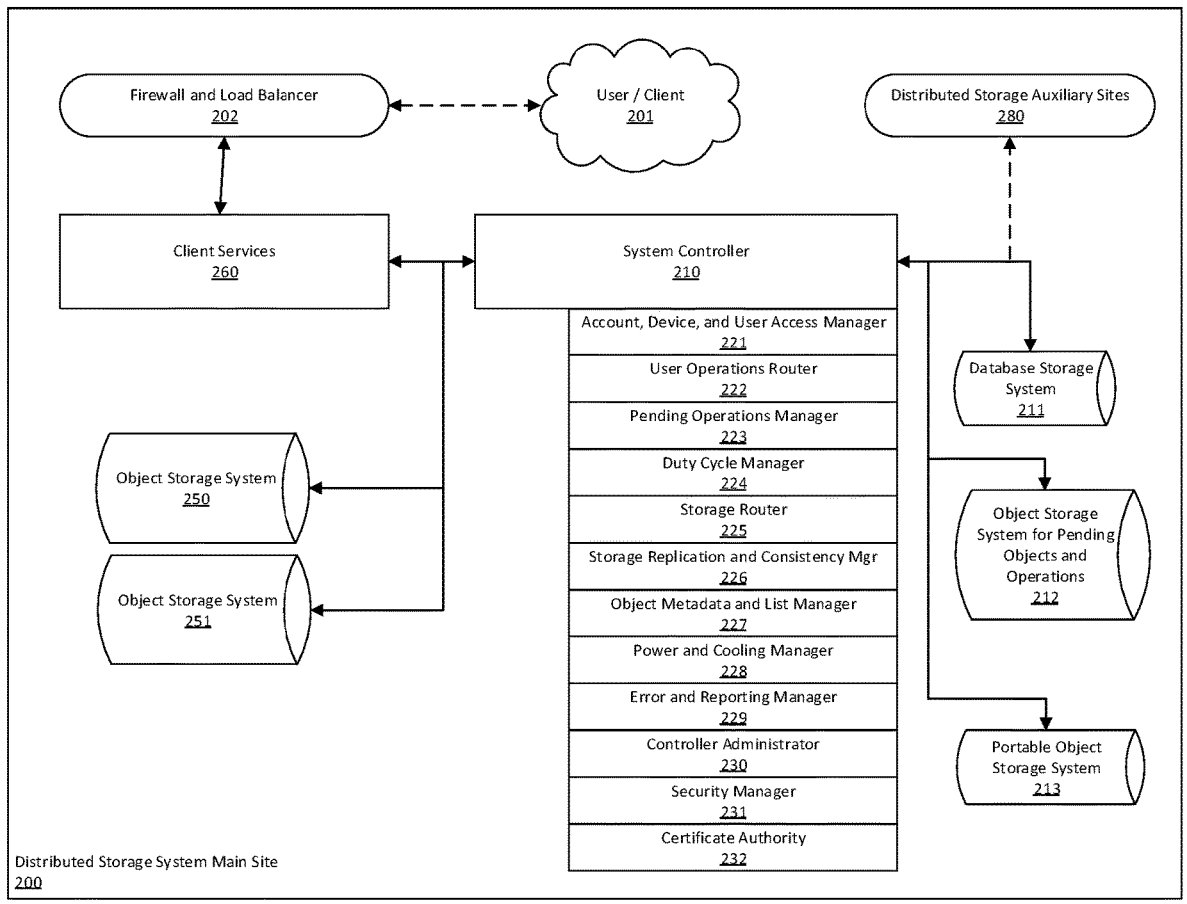
Figure 2: Distributed Storage System Main Site

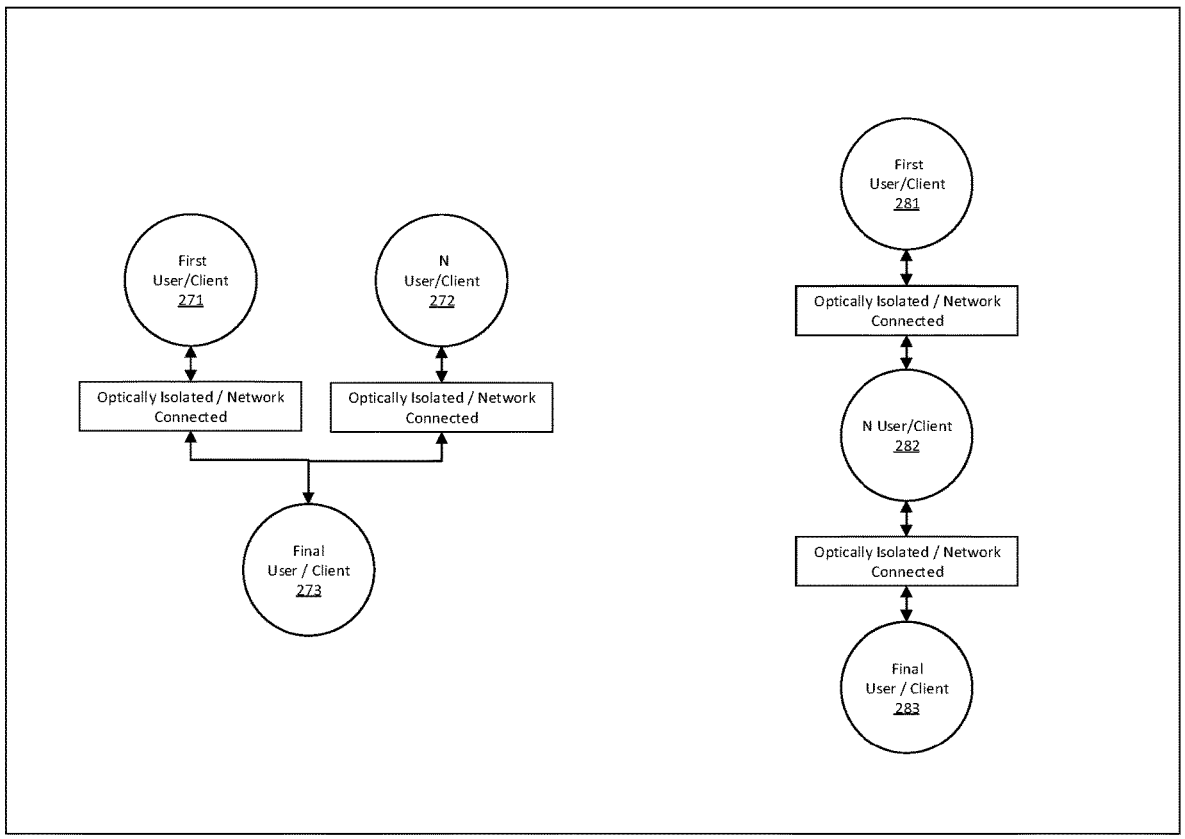
Figure 2a: Client Communication in Multiple Factor Digital Credential Operations

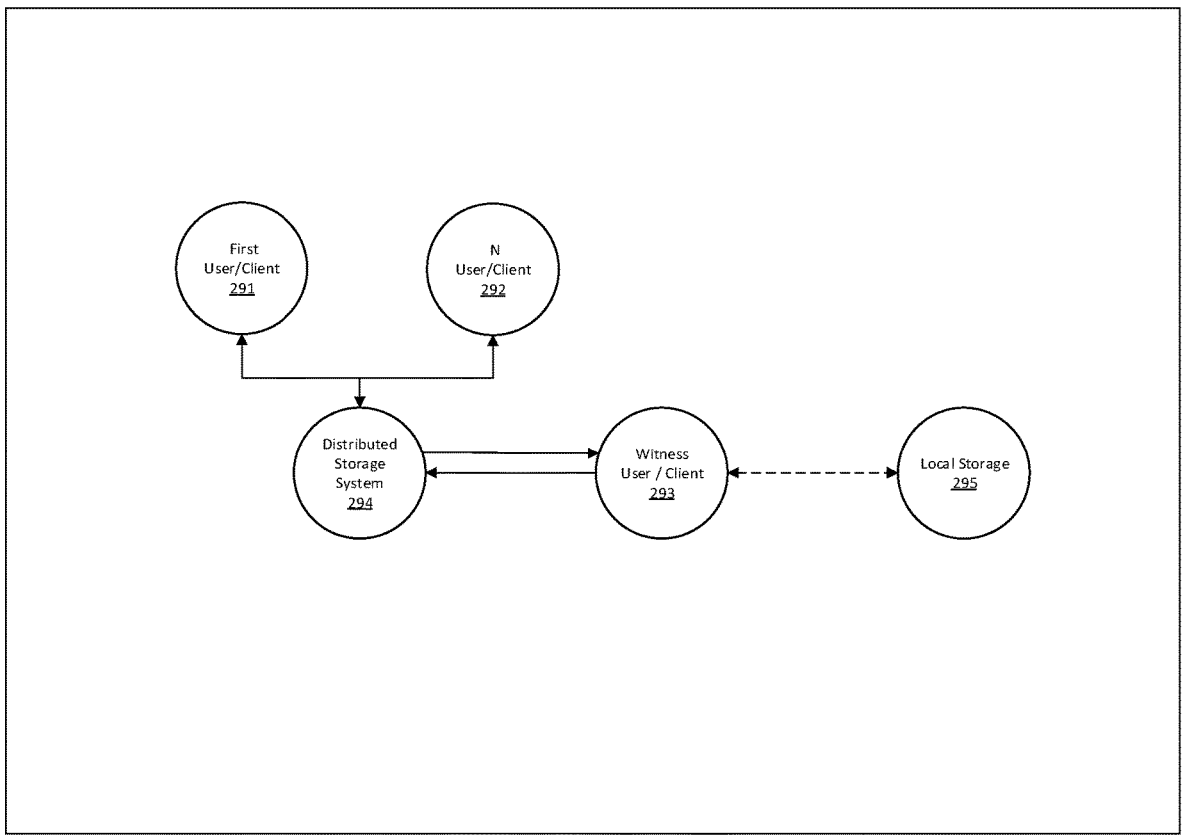
Figure 2b: Client Communication in Digital Credential Witness Operations

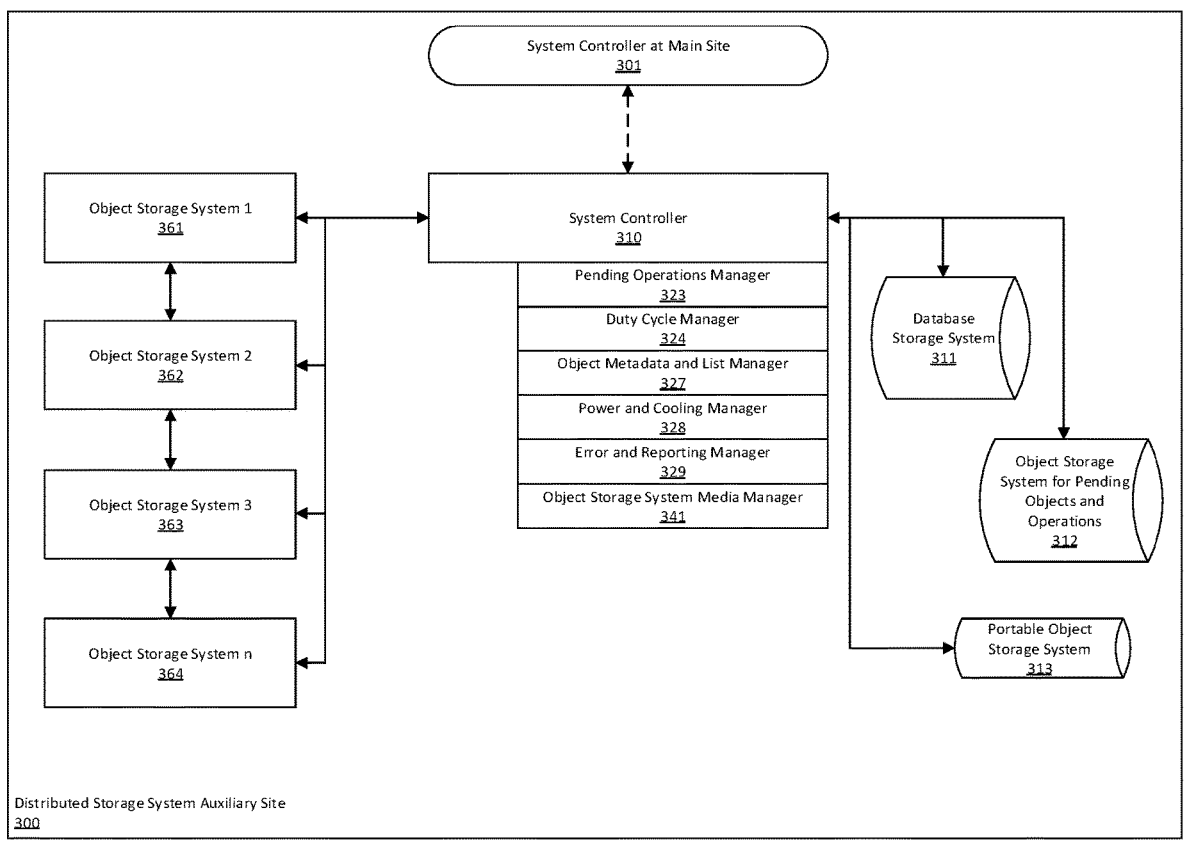
Figure 3: Distributed Storage System Auxiliary Site

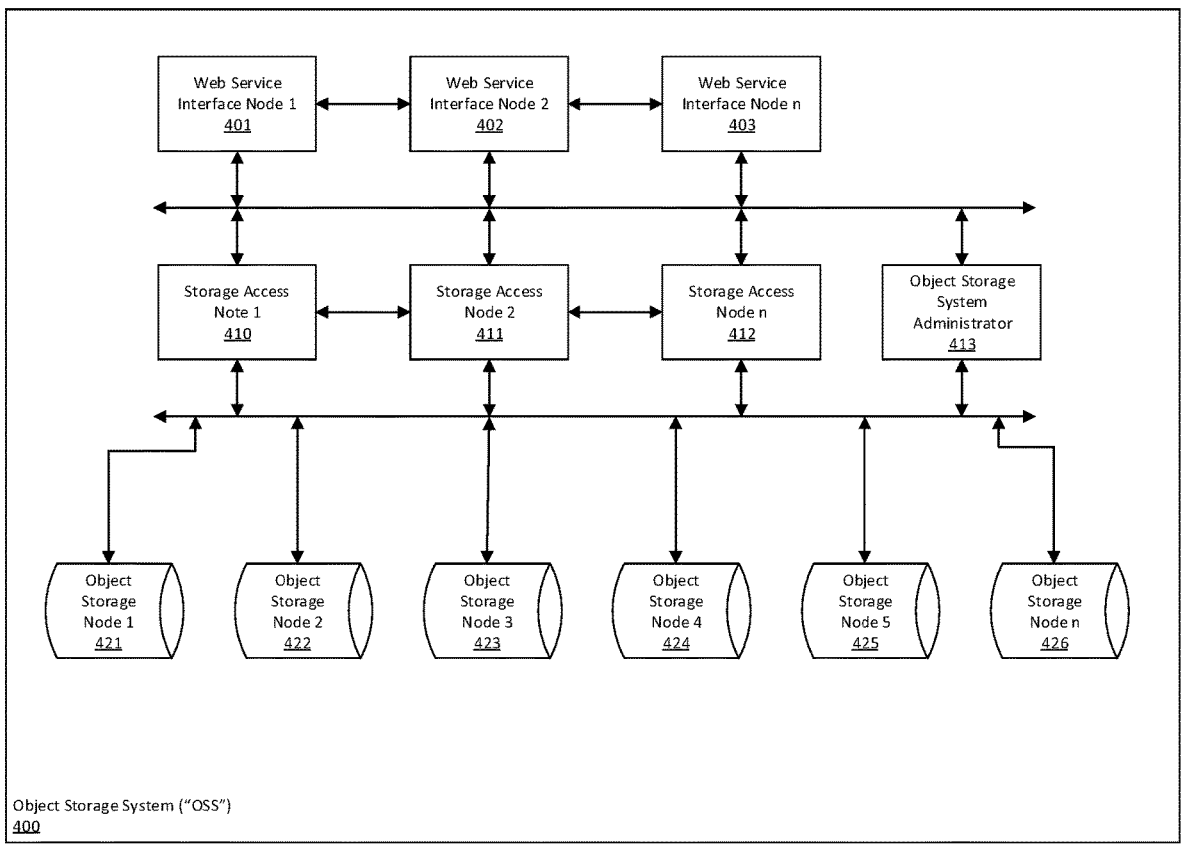
Figure 4: Object Storage System

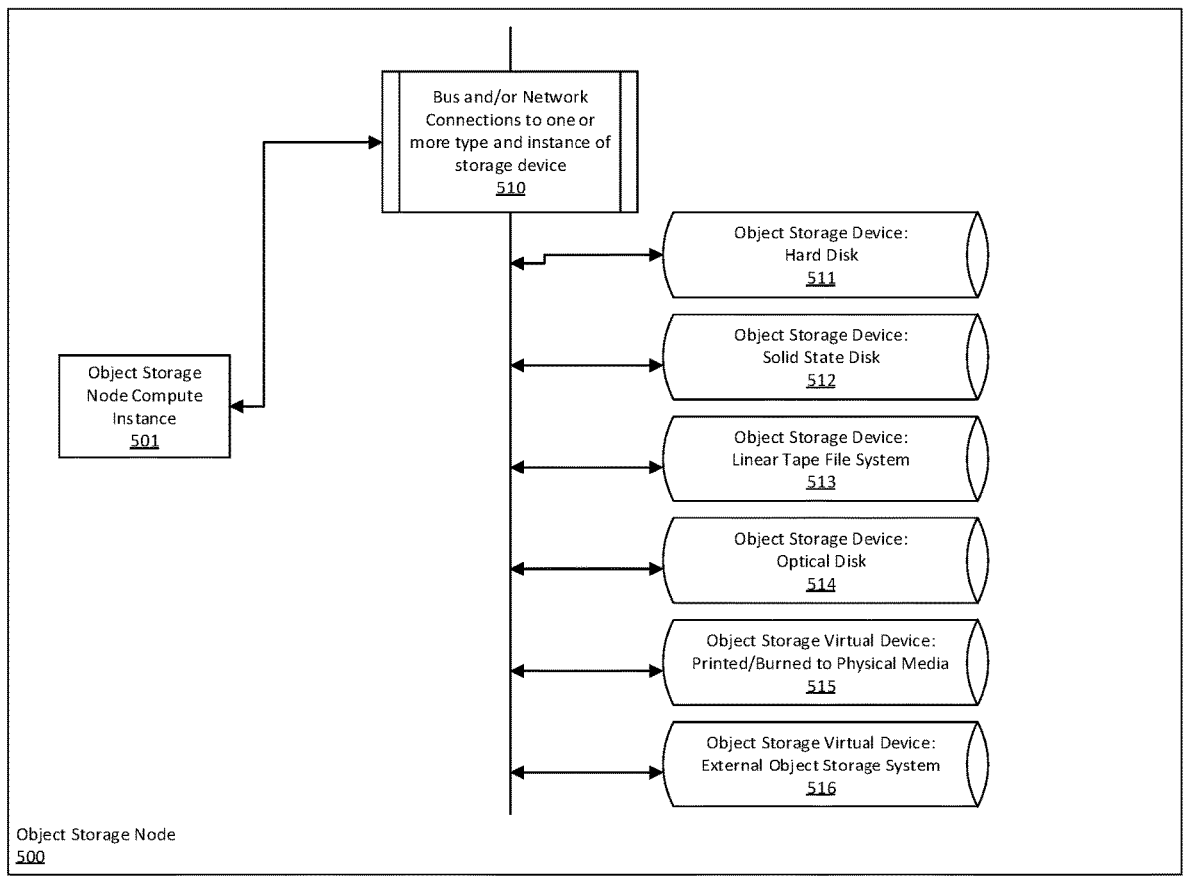
Figure 5: Object Storage System: Storage Node Storage Types

DISTRIBUTED STORAGE SYSTEM FOR LONG TERM DATA STORAGE

RELATED APPLICATION

This application is a continuation-in-part of U.S. patent application Ser. No. 14/692,699, filed on Apr. 21, 2015 and entitled "DISTRIBUTED STORAGE SYSTEM FOR LONG TERM DATA STORAGE", now issued as U.S. Pat. No. 10,069,914, issued on Sep. 4, 2018, which claims the priority of U.S. Provisional 61/982,261, filed on Apr. 21, 2014 and entitled "LONG TERM DATA STORAGE IN A DISTRIBUTED STORAGE SYSTEM" all of which is hereby incorporated by reference in its entirety.

TECHNICAL FIELD

This invention relates to a data storage systems and, more particularly, to a collection of data storage systems that act in concert to effect long-term durable data storage.

BACKGROUND

As both the workplace and our personal lives rely increasingly on digital documents and files, a persistent means of storing those objects is becoming increasingly important. The applications that are used on all types of computing devices are creating more and more digital content that is important to retain. For example, common office and multimedia applications create and consume data of various types and formats such as text documents, spreadsheets, images, audio, video, and application specific data. Increasingly, it is desirable to both store and repeatedly access this data from a number of different devices over an extended period of time. User expectations and application functionality require that this data be available from on-demand, near-line, and archival data storage sources.

As personal and mobile computing systems have matured into useful devices, the primary storage medium for application data is most commonly a magnetic fixed drive or "hard drive." This types of storage device is typically either a permanent, installable, or a removable device and is available to application software for data storage. As a part of a local personal computer or mobile computer, this storage is typically multi-purpose storage that is used for the operating system, local application installation, and data storage. It is typically accessible to a single user or small number of users and tends to be a data storage "island" for which data can be copied or written, but is not easily shared. With special security configurations and/or dedicated server computers, such data can be shared on the local network among users that have access to the local network. However, such shared access does not typically extend in a robust and secure fashion on wide area networks such as the Internet.

Application storage on personal and mobile storage systems are convenient, but generally lack the reliability for either medium-term or long-term storage. In part, this lack of reliability extends from the fact that most storage only saves one copy of the application data. In some cases, technologies like RAID (Redundant Arrays of Inexpensive Disks) are used on local networks to provide some data reliability. In general, applications and users are left to manage their own data redundancy in order to provide a measure of data resilience and reliability.

Solutions known as Object Storage Systems (object storage systems or OSS) are beginning to emerge that provide a robust means of preserving data while making such data available to a wide area network such as the Internet. An example of such an Object Storage System is disclosed by Vermeulen, et al. in U.S. Pat. No. 8,185,497 (2012) and application U.S. App. 2013/0212165 (2013). Data is stored on these systems in the form of Objects. Objects are comprised of the data to be stored, metadata that describes storage and content attributes of such data, and an identifier that can be used to reference such data. While several major embodiments exist for Object Storage Systems, such systems tend to have a consistent functions and behaviors that a) expose as a simple set of web services that allow objects to be listed, saved, retrieved, updated, and deleted, b) allow objects to be placed in folders or buckets that group objects logically, c) provide for storage of more than one replica of the object in one or more physical locations, and d) provide scheduled object integrity checking to insure that the replicas are consistent and when found to be inconsistent, new replicas of an object are automatically created. In addition, some Object Storage System embodiments provide for a) access control lists for folders and/or objects based on granted permissions and parameter, b) intelligent location of objects based on data age, usage, importance, and/or modifications, c) multiple versions of the same object, d) granular control of placement of objects at one or more locations, and e) account control and billing based on storage, bandwidth, or other limits.

Historically, the storage of important documents and works are measured by tens, hundreds, and sometimes even thousands of years. While Object Storage Systems (OSS) are effective for short-term and medium-term object storage, they are not well suited to address the challenges of longer-term object storage, e.g. the storage of objects for more than ten years. Such Object Storage Systems are optimized for cost and convenience at the expense of long term resilience and security, typically measuring resilience only by storage system characteristics and omitting resilience factors related to geopolitical, economic, and organization characteristics. In particular, such Object Storage Systems are inadequate for longer-term storage because a) a single Object Storage System requires large quantities of node-to-node bandwidth therefore geo-redundant replicas of such a system tend to be located within miles instead of being diverse across a large geographical area such as a continent, b) such Object Storage Systems require all nodes to be powered-on and communicating thus consuming a large amount of energy in order to maintain consistent reliable storage of objects that are rarely accessed, c) such Object Storage Systems are generally located in the same geopolitical area and are subject to political and/or legal risks such as confiscation, regulation, or forced shutdown, d) such Object Storage Systems are subject to economic risks of the Object Storage System operator such as bankruptcy, profitability, unknown storage costs for users, and business plan obsolescence, e) such Object Storage Systems are subject to geographic risks where said Object Storage System is located such as natural disaster, climate effects, and resource constraints such as energy shortages, f) current embodiments of such Object Systems typically do not provide robust mechanisms for end-to-end user confidentiality, authentication, and security, and g) current embodiments of such Object Systems typically do not provide for confidentiality, authentication, and security that will survive the lifetime of the user and/or said Object Storage Systems. A storage system disclosed by Grove, et al. in U.S. Pat. No. 8,892,677 (2014) allows the consumer of a storage system to dynamically request a one of a plurality of hosted storage services as a storage target. However, this system does not address the compelling requirements of long term data storage and therefore does not significantly improve on the shortcoming of Object Storage Systems as recited. Metzer, et al. in U.S. Pat. No. 8,726,351 (2014) discloses an archive system that provides highly granular security access and workflow methods for paper and electronic governmental archives that must be "retained forever", but focuses primarily on the means of access and verification germane to that particular application. In an attempt to address local and hosted storage synchronization, Velummylum, et al. in U.S. App. 2012/0254340 (2012) addresses what would appear to systems and methods that have been long in use for the caching of documents and files during synchronization between systems.

A Distributed Storage System (DSS) as disclosed herein embodies enhances object storage functionality to address these and other shortcomings of a standalone Object Storage Systems. Significant benefits of such a Distributed Storage System include a) adaptability to very low bandwidth connecting networks thus achieving eventual consistency between Object Storage Systems that are widely distributed around the globe and/or connected by low bandwidth networks, b) efficiency that enables very low energy consumption per storage unit by allowing secondary replicas of objects to reside in Object Storage Systems that remain powered-off at rest except for periodic validations and object management operations thus making possible practical renewable energy based storage systems, c) resilience strategy that mitigates risk posed by political and legal frameworks such as confiscation, regulation, or forced shutdown by making possible operations across diverse political and legal environments, d) resilience strategy that mitigates risk posed by economic factors of the Object Storage System operator such as bankruptcy, profitability, unknown storage costs for users, and business plan obsolescence by making possible operations across a plurality of operating organizations, e) resilience strategy that mitigates risk posed by geographic factors such as natural disaster, climate effects, and resource constraints (e.g. energy shortages) by making possible operations that are located across a wide geographic area, f) strong endpoint to endpoint authentication and privacy functionality that is distributed across multiple political, geographic, and organizational boundaries such that the ownership and disclosure rights of stored objects are not ultimately compromised or waived, and g) structured and inheritable rights for user access, authentication, and privacy to stored objects whereby enabling multi-generational ownership of stored objects for tens and hundreds of years.

Unless specifically stated as such, the preceding is not admitted to be prior art and no statement appearing in this section should be interpreted as a disclaimer of any features or improvements listed.

BRIEF DESCRIPTION OF THE INVENTION

Various embodiments of a Distributed Storage System (DSS) for long-term storage duration are disclosed herein.

According to one embodiment, a Distributed Storage System for long-term storage duration may be implemented utilizing one or more distinct storage sites that are comprised of at least one system controller and at least one Object Storage Systems (OSS) that are grouped together as described herein in logical and/or physical storage sites. One or more storage sites in various locations that act in concert embody a single Distributed Storage System (DSS).

Embodiments of the disclosed Distributed Storage System may utilize various Object Storage Systems that include, but are not limited to, a) web-service based Object Storage Systems that maintain multiple replicas of a stored object, are stand-alone or hosted, and generally include compute nodes configured as web services interfaces, storage nodes, storage coordinators, and storage administration, wherein each storage node is configured to use one or more storage mechanisms that may consist of hard drives, solid state drives, linear tape file system, optical drives, objects encoded and printed to physical media, or another Object Storage System, b) JBOD, RAID, NAS, iSCSI, or SAN based file storage, c) tape based storage configured to function as a linear tape file system, d) optical based storage system, and e) objects encoded and printed to physical media.

Embodiments of the disclosed Distributed Storage System include Object Storage Systems that are configured to implement the effective equivalence of duty-cycle operations wherein such Object Storage Systems are individually powered on for a limited period of time during which reads, additions, updates, deletions, maintenance, object-consistency checking, and replication operations are performed. In practice, various object, maintenance, and command operations are directed toward a particular Object Storage System in a powered-off state. Operational requirements such as number and importance of queued operations and the time since last powered on play a role in determining when a particular Object Storage System is powered on to complete pending operations. Object Storage Systems that are selected for active operations are powered on and prepared for use by performing error and consistency checks as well as any required replication or maintenance operations. When the Object Storage System completes these startup and maintenance procedures, the Object Storage System responds to system requests such as reads, additions, updates, deletions, maintenance, object-consistency checking, and replication operations. After the performance of these and any other necessary operations, the Object Storage System is powered off in an orderly fashion until the next point in time that operational requirements demand that the system is powered on for a similar use. The portions of any such Object Storage System that use off-line storage mechanisms such as tape, optical media, or printed media may have long-duty cycles as determined by usage requirements.

Embodiments of the disclosed Distributed Storage System may include rule based replication, consistency, and storage system control engines that direct multiple Object Storage Systems in one or more sites to act in concert to comprise a complete Distributed Storage System. Such control engines may include, but are not limited to, the following functionality: a) Object storage and node configuration management including setup, maintenance, power on/off, and monitoring, b) user and role based authentication and access control, c) routing and switching of data and operational requests from user, d) routing and switching of replication and operational requests between sites and/or Object Storage Systems, e) orchestration of consistency checking and object health reporting on a system and user level, f) media management of off-line storage media such as tape, optical disk, or printed media, g) site security and monitoring, h) establishing and maintaining an index-based object locators and information for objects stored on the system, i) object recovery and system integrity protection mechanisms, j) auditing and reporting on object, user, account, and system levels, k) establishing and maintaining object characteristics and descriptors such as size, storage locations, replica information, validation status, create date, modified date, cached date, and 1) caching of pending operations and objects until the designated Object Storage System is ready for storage operations.

Embodiments of the disclosed Distributed Storage System may utilize one or more distinct Object Storage Systems to a) store and retrieve objects and operational messages in transit to and from a user, b) store and retrieve objects and operational messages in transit between multiple Object Storage Systems, and c) allow on-demand storage of an object for a user-designated period of time after any additions, updates, or deletions of that object.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGS and detailed description. It is intended that all such additional systems, methods, features and advantages that are included within this description, be within the scope of the claims.

BRIEF DESCRIPTION OF FIGURES

The novel features believed characteristic of the disclosed subject matter will be set forth in the appended claims and any claims filed later. The disclosed subject matter itself, however, as well as a preferred mode of use, further objectives, and advantages thereof, will best be understood by reference to the following detailed description of illustrative embodiments when read in conjunction with the accompanying drawings, wherein:

FIG. 1 shows a block diagram illustrating overall system architecture for a Distributed Storage System for long-term storage duration according to an embodiment of the disclosed subject matter.

FIG. 2 shows a block diagram illustrating Distributed Storage System main site functional components according to an embodiment of the disclosed subject matter.

FIG. 2a shows a block diagram illustrating client communication in multiple factor digital credential operations according to an embodiment of the disclosed subject matter.

FIG. 2b shows a block diagram illustrating client communication in digital credential witness operations according to an embodiment of the disclosed subject matter.

FIG. 3 shows a block diagram illustrating Distributed Storage System auxiliary site functional components according to an embodiment of the disclosed subject matter.

FIG. 4 shows a block diagram illustrating Object Storage System functional components according to an embodiment of the disclosed subject matter.

FIG. 5 shows a block diagram illustrating object storage node functional components with optional storage types according to an embodiment of the disclosed subject matter.

DETAILED DESCRIPTION

Although described with reference to certain embodiments, those with skill in the art will recognize that the disclosed embodiments have relevance to a wide variety of areas in addition to those specific examples described below. Further, elements from one or more embodiments may be used in other embodiments and elements may be removed from an embodiment and remain within the scope of this disclosure.

All references, including publications, patent applications, and patents, cited herein are hereby incorporated by reference to the same extent as if each reference were individually and specifically indicated to be incorporated by reference and were set forth in its entirety herein; provided, however, to the extent there exists a conflict between this disclosure and a document incorporated by reference, this disclosure shall control.

As referenced herein, objects are comprised of the data to be stored, metadata that describes storage and content attributes of such data, and an identifier that can be used to reference such data.

As referenced herein, the concept of files and objects are interchangeable due to the fact that local operating systems tend to describe collections of content as files whereas object storage systems tend to describe collections of content as objects.

As referenced herein, the preferred embodiment of Object Storage Systems (object storage systems or OSS) are systems of computers and instructions in various embodiments that can be generally described as being comprised of functionality to a) expose as a simple set of web services that allow objects to be listed, saved, retrieved, updated, and deleted, b) allow objects to be placed in folders or buckets that group objects logically, c) provide for storage of more than one replica of the object in one or more physical locations, and d) provide scheduled object integrity checking to insure that the replicas are consistent and when found to be inconsistent, new replicas of an object are automatically created. In addition, some Object Storage System embodiments provide for a) access control lists for folders and/or objects based on granted permissions and parameter, b) intelligent location of objects based on data age, usage, importance, and/or modifications, c) multiple versions of the same object, d) granular control of placement of objects at one or more locations, and e) account control and billing based on storage, bandwidth, or other limits. An example of such an Object Storage System is disclosed by Vermeulen, et al. in U.S. Pat. No. 8,185,497 (2012). Other embodiments of computing systems that provide data storage and can be configured as functional object storage system with various characteristics include computing systems that function as JBOD, RAID, NAS, iSCSI, or SAN based file storage, computing systems that function as magnetic tape based file storage, computing systems that function as optical disk based file storage, and computing systems that mark physical media with representations of data thereby functioning as physical media based file storage.

As referenced herein, an Object Storage System may be physically or logically located within a storage site. Further, an Object Storage System that is logically located within a storage site may be owned, operated, and controlled by a third party provider of Object Storage System services.

As referenced herein, a client is a computing device configured to provide functionality that enables a user to access the object and system services provided by a Distributed Storage System. In addition, any number and type of compatible computing devices may be configured to provide said access such that object replicas and account information are optionally synchronized between said computing devices. Further, a client may access object and system services provided by a Distributed Storage System using authority delegated to said client by a authenticated user for the purpose of specified operations.

As referenced herein, a user is an authorized consumer of the object and system services provided by a Distributed Storage System and while said user may gain access to said Distributed Storage System via an authorized and authenticated client, said user will authenticate access with said Distributed Storage System independently of any client that may be used by said user to access said Distributed Storage System.

As referenced herein, a storage site refers to a logical or physical site configured as a main site FIG. 2 and/or an auxiliary site FIG. 3.

FIG. 1 shows a block diagram illustrating overall system architecture for a Distributed Storage System for long-term storage. In its most basic embodiment, the overall Distributed Storage System 100 for long-term storage duration may be implemented comprising a plurality of logical and/or physical distributed storage sites, each such site being configured as a main site or an auxiliary site and each site comprised of at least one system controller and at least one Object Storage System. In general, the preferred embodiment of the system comprises a) at least one main site 101, 102 with one or more of said main sites acting as the active main site 101, and one or more of said additional main sites acting as active or passive main sites 102 for the purposes of load balancing and/or fail-over functionality, and b) at least one auxiliary site 111, 112, 113. The main sites 101, 102 and auxiliary sites 111, 112, 113 in various locations act in concert in order to embody a single Distributed Storage System. Users and/or clients 120 of these services may connect to main sites 101, 102 via publically and/or privately accessible networks. The main sites 101, 102 connect to auxiliary sites 111, 112, 113 via privately accessible networks. The main sites 101, 102 provide public and/or private services to users for storing, maintaining, and retrieving objects containing various types of data. These object operations are non-trivial operations that result in the storage of objects on one or more main sites 101, 102 and/or auxiliary sites 111, 112, 113. Main site 101, 102 operations are more fully described in FIG. 2. The auxiliary sites 111, 112, 113 provide services to main sites 101, 102 for the purpose storing replicas of the objects supplied by one or more main sites 101, 102. Auxiliary sites 111, 112, 113 are more fully described in FIG. 3. The locations of sites are determined based on operational and functional requirements. The site locations can be in close proximity or long distances apart, connected by high or low capacity networks. If insufficient network capacity is available between sites, the system will allow data to be moved between sites by transferring data and commands to portable storage media and physically transporting the storage media between sites.

In the general case of writing objects to the Distributed Storage System, the authenticated user and/or client 120 sends a write operation request along with the object to be written via an authenticated session on the connected network to an active main site 101, 102. The said active main site 101, 102 processes the write request for said object according to user account settings and previously written replicas and versions of said object in order to a) determine the main sites 101, 102 and/or the auxiliary sites 111, 112, 113 to which said object is to be written and queues write requests along with said object for writing to site local Object Storage System and/or transfer to remote sites via an authenticated session on the connected network, b) supervises any such local or remote write requests between the main sites 101, 102 and/or the auxiliary sites 111, 112, 113, and c) provides in-process and final status of write operations to the user and/or client 120. In the event that a non-local main site 101, 102 and/or an auxiliary site 111, 112, 113 receives such a write request from an active main site 101, 102, said remote site processes the write request for said object according to user account settings and previously written replicas and versions of said object in order to a) queue write requests along with said object for writing to one or more local Object Storage Systems, b) supervises any such local write requests, and c) provides in-process and final status of write operations to main site 101, 102 that initiated the write request. The general case of writing objects to the Distributed Storage System is more fully described in FIGS. 2, 3, 4, and 5.

In the general case of reading objects for status and/or content from the Distributed Storage System, the authenticated user and/or client 120 sends a read operation request along with the object identifying parameters and read priority via an authenticated session on the connected network to an active main site 101, 102. The said active main site 101, 102 processes the read request for said object according to user account settings and previously written replicas and versions of said object in order to a) determine the main sites 101, 102 and/or the auxiliary sites 111, 112, 113 from which said object is to be read and queues said read requests to selected local Object Storage System or remote sites via an authenticated session on the connected network, b) supervises any such local or remote read requests between the main sites 101, 102 and/or the auxiliary sites 111, 112, 113 optionally allowing a plurality of said sites to process the request and upon receipt of the first successful read result, cancels the remainder of outstanding read requests, and c) eventually queues the read request status and any successfully retrieved object for delivery to the user and/or client 120. In the event that a non-local main site 101, 102 and/or an auxiliary site 111, 112, 113 receives such a read request from an active main site 101, 102, said remote site processes the read request for said object according to user account settings and previously written replicas and versions of said object in order to a) queue read requests for reading said object from one or more local Object Storage Systems, b) supervises any such local read requests, and c) eventually queues the read request status and any successfully retrieved object for delivery to main site 101, 102 that initiated the read request. The general case of reading objects from the Distributed Storage System is more fully described in FIGS. 2, 3, 4, and 5.

In the general case of deleting objects from the Distributed Storage System, the authenticated user and/or client 120 sends a delete operation request along with the object identifying parameters via an authenticated session on the connected network to an active main site 101, 102. The said active main site 101, 102 processes the delete request for said object according to user account settings and previously written replicas and versions of said object in order to a) determine the main sites 101, 102 and/or the auxiliary sites 111, 112, 113 from which said object is to be deleted and queues said delete requests to selected local Object Storage System or remote sites via an authenticated session on the connected network, b) supervises any such local or remote delete requests from the main sites 101, 102 and/or the auxiliary sites 111, 112, 113, and c) eventually queues the delete request status for delivery to the user and/or client 120. In the event that a non-local main site 101, 102 and/or an auxiliary site 111, 112, 113 receives such a delete request from an active main site 101, 102, said remote site processes the delete request for said object according to user account settings and previously written replicas and versions of said object in order to a) queue delete requests for reading said object from one or more local Object Storage Systems, b) supervises any such local delete requests, and c) eventually queues the delete request status for delivery to main site 101, 102 that initiated the read request. The general case of deleting objects from the Distributed Storage System is more fully described in FIGS. 2, 3, 4, and 5.

In the event that main sites 101, 102 are not accessible to users, auxiliary sites 111, 112, 113 may provide access to Distributed Storage System functionality directly to users and/or devices. Further, user accounts may be configured to provide direct user access to objects stored in third party Object Storage Systems utilized in any main site 101, 102 or auxiliary site 111, 112, 113 in the event that the Distribution Storage System sites become inoperative for an extended period of time.

FIG. 2 shows a block diagram illustrating Distributed Storage System main site functional components for a Distributed Storage System for long-term storage. The Distributed Storage System shown in FIG. 1 uses a Distributed Storage System main site 200 as a gateway for public and/or private network user and/or clients 201 to access object storage functionality using typical firewalls and load balancers 202. The Distributed Storage System main site 200 may co-exist with other Distributed Storage System main sites in either an active/active or active/passive configuration. The Distributed Storage System main site 200 is comprised of at least one system controller 210 and at least one Object Storage System 250, 251 and may be comprised of a plurality of system controllers 210 and a plurality of Object Storage Systems 250, 251. The Distributed Storage System main site 200 provides client services 260 to the user such as object storage, update, validation, retrieval, and deletion, object statistics and listings, and user account management and authentication. Client services 260 utilize an internal Object Storage System 250, 251 and system controller 210 as resources to help provide services to the user. In the preferred embodiment, the Object Storage System 250, 251 is powered on and active in order to store and retrieve objects, operational messages and objects in transit to and from a user, and on-demand storage of an object for a user-designated period of time after any additions, updates, or deletions of that object. Client services 260 depend on the account, device, and user manager 221 and object metadata and list manager 227 to provide session management for users that include user, device, and/or account authentication, session security management and encryption, user and device access control list management and enforcement, user, device and account usage monitoring and limiting of storage and bandwidth. Client services 260 depend on the object metadata and list manager 227 to provide organized and ordered object lists and object metadata to the users. Client services 260 depend on the Object Storage System 250, 251 and the system controller 210 to store, update, validate, retrieve and delete objects as requested by the user on both the main and auxiliary sites.

The system controller 210 includes, but is not limited to, the following functional groups: account device, and user access manager 221, user operations router 222, pending operations manager 223, duty cycle manager 224, storage router 225, storage replication and consistency manager 226, object metadata and list manager 227, power and cooling manager 228, error and reporting manager 229, controller administrator 230, security manager 231, certificate authority 232, database storage system 211, Object Storage System for operations and pending objects 212, and portable Object Storage System 213. Further the system controller 210 is network connected to distributed storage auxiliary sites 280 that are further described in FIG. 3. The system controller 210 provides the described functions as a logical collection of functions that may be implemented on one or more server physical and/or virtual instances that may be accessed via the system controller interface or by the interfaces of the described functionality. Any functional group of the system controller 210 may use any or all other functional groups of the system controller 210, the Object Storage System 250, 251, or client services 260 in order to provide its functionality. The system controller 210 is configured to provide physical hardware control, operating system control, application control, processing control, processing, storage, management services, and reporting services to the local storage site and limited by system configuration may also provide physical hardware control, operating system control, application control, processing control, processing, storage, management services, and reporting services for other storage sites.

The account, device, and user manager 221 includes functions as follows: a) provides means to create, maintain, manage, and remove accounts, devices, and users, b) authenticate accounts, devices, and users as consumers of the Distributed Storage System functions, c) may use password, digital credentials, or other basis for user authentication, d) provides session management and encryption parameters, e) provides for creation and maintenance of account, device, and user access control list and management, f) tracks and enforces account, device, and user usage limits on storage and bandwidth, g) replicates account, device, and user information as appropriate to insure system continuity, h) provides for reliable time-stamping and certificate authority services, i) provides services for single factor or multiple factor authentication of accounts, devices, and users, and j) caches device and user session parameters as appropriate.

The user operations router 222 includes functions to manage operations from and to users and/or clients 201 as follows: a) management of load balancing for client services, b) management of client services instances, c) routing of user operations to auxiliary sites that cannot be fulfilled by main site, d) acting with the permission of the user and on behalf of the client 201 to access third party sites for the purpose of importing content into the Distributed Storage System, optionally designating it for review by the user before committing the imported content to storage, e) enabling client 201 to another client 201 communications to facilitate single factor or multiple factor user authentication and security for various user operations, f) enabling witness operations by routing user operation requests to and from witness user and/or client 293, and g) managing errors that are specific to a user.

The pending operations manager 223 includes functions as follows: a) creates, updates, and deletes pending operations records as they are created by various functions within the Distributed Storage System, b) monitors the status of pending operations and takes the appropriate actions upon the completion of a pending operation, c) provides for the management of pending operations with a plurality of steps or status changes, d) may optimize pending operations by analyzing related operations and removing redundant or unnecessary operations from the pending operations queue, e) creates error reports and implements optimal recovery for operational errors, f) uses rules that define the appropriate action(s) required by operations during the steps of the pending operation, g) creates and monitors the completion status of pending operations at Distributed Storage System auxiliary sites, h) coordinates subset(s) of pending operations across a plurality of Distributed Storage System auxiliary sites such that the pending operation is completed in its entirety in all main and auxiliary sites, i) uses internal and/or external services to communicate with Distributed Storage System auxiliary sites and external processes with reliable guaranteed messaging and object transfer as appropriate, j) creates, updates, maintains, and deletes object metadata as appropriate to reflect the status and state of pending operation steps as they are completed, and k) may provide the user status feedback on the completed operation.

The duty cycle manager 224 includes functions as follows: a) aggregates and reports duty cycle manager status and operations from Distributed Storage System auxiliary sites, b) controls, configures, and maintains the power and cooling requirements and operational status of all Distributed Storage System main site 200 components, c) maintains a priority list of system components critical to operations, and e) responds to authenticated commands to control the operational status of the any of the functional components of the Distributed Storage Systems main site 200 in conjunction with the power and cooling manager 228.

The storage router 225 includes functions as follows: a) uses internal and/or external services to communicate with Distributed Storage System auxiliary sites and external processes with reliable and guaranteed object transfer as appropriate, b) monitors the status and performance of Distributed Storage System auxiliary sites and schedules object transfers to said sites via connected network or by storing the object on a portable Object Storage System 213 that will be subsequently physically transferred to the target Distributed Storage System auxiliary site, c) monitors the status and performance of Distributed Storage System auxiliary sites with the purpose of using a connected network to transfer an object to said Distributed Storage System auxiliary site that was previously written to a portable Object Storage System 213 and removing said object from the portable Object Storage System 213 on successful transfer, d) managing the consumption of bandwidth used for object transfer via the network, e) receives objects from Distributed Storage System auxiliary sites, stores those objects to Object Storage System 250, 251, and reports the status of such transfer to the pending operations manager 223, and e) reporting the status of transfer operations upon completion or failure.

The storage replication and consistency manager 226 includes functions as follows: a) checks object metadata and list manager 227 and the pending operations manager 223 on a periodic and/or on-demand basis to ascertain the object replication and consistency status and takes any necessary actions leading to the improvement of object reliability and consistency across both main and auxiliary sites, and b) aggregates and reports replication and consistency status and operations from Distributed Storage System auxiliary sites.

The object metadata and list manager 227 includes functions as follows: a) creates, updates, maintains, and deletes metadata information for each object stored including original filename, folder, version, creation date, last update date, storage locations, replica statistics, replica hashes, and replica verification and consistency, and b) creates, updates, maintains, and deletes relational database information for object original location folder trees and lists, object storage locations, pending operations, system wide site and node configuration, operations, power, and cooling control information, and account, device, and user information.

The power and cooling manager 228 includes functions as follows: a) aggregates and reports electrical power usage and availability from Distributed Storage System main and auxiliary sites, b) provides command and control for electrical power usage and availability at Distributed Storage System main and auxiliary sites for the purpose of efficiency, reliability, economy, optimizing renewable energy usage, operation and maintenance of uninterruptible power systems, selecting power sources based on stability and availability, enabling orderly power-on of the critical system components, enabling orderly and priority-based power-on startup and operations of system components to apply the best use-case of available electrical power, enabling main and/or auxiliary site power-down in the event of catastrophic power loss, and scheduling system, site, or node orderly power-down in the event irreplaceable power loss so that the affected parts of the system are powered-down to a stable state prior to complete power loss, c) aggregates and reports cooling status from Distributed Storage System main and auxiliary sites, and d) provides command and control for cooling systems at Distributed Storage System main and auxiliary sites for the purpose of efficiency, reliability, economy, optimizing cooling source usage, selecting cooling sources based on thermodynamic properties, stability and availability, enabling main and/or auxiliary site power-down in the event of catastrophic cooling loss.

The error and reporting manager 229 includes functions as follows: a) aggregates and reports errors from Distributed Storage System main and auxiliary sites, b) presents operational status, events, warning, and alerts to the user via various client interfaces including web, application, and telecommunication services, and c) allows administrative users to take action on reported events limited by user rights and operational necessity.

The controller administrator 230 includes functions as follows: a) provides system administrator control over the Distributed Storage System, b) provides means to create, maintain, manage, and remove system users, c) limit system user rights to view and/or manage portions and/or functions of the system, authenticate accounts, devices, and users as consumers of the Distributed Storage System functions, and d) functions in coordination with all other components of the system controller 210 to accomplish the operation and management of the Distributed Storage System.

The security manager 231 includes functions as follows: a) provides challenge response protocols to support authentication and the establishment of user session credentials between client services 260 and a client 201 or between the members of any group of Distributed Storage System functional computing units, b) calculates and validates digital signatures, c) provides a source of pseudo-random numbers, d) provides various ticket granting protocols that issue and validate tickets in order to provide parties to any given transaction the ability to delegate access rights for a specific transaction to designated third parties, e) provides time stamping functions by using internal protocols or by acting a proxy for third party time stamping services, f) creates and validates one-time use personal identification numbers (PIN), and g) provides extra measures of physical, electrical, environment, magnetic, and/or radio frequency security in order to deny attackers the ability to comprise integrity of the security operations.

The certificate authority 232 includes functions that issue digital credentials as follows: a) processes certificate signing requests and issues digital certificates using a certificate authority certificate, b) keeps an independent audit trail of certificates issued, and c) provides extra measures of physical, electrical, environment, magnetic, and/or radio frequency security in order to deny attackers the ability to comprise the private key of the certificate authority.

The database storage system 211 includes functions typical of a relational database system and provides for databases and tables of optimized data required by any of the components of the system controller 210 and may further include clustered nodes and secure local and/or remote replication functionality to maintain data integrity and reliability.

The Object Storage System for pending objects and operations 212 includes the means for the storage, maintenance, and retrieval of operational data and object storage required by any of the components of the system controller 210 as well as the metadata for objects stored on the Distributed Storage System for the purpose of initiating, queuing, or completing an operation.

The portable Object Storage System 213 includes the means for the storage, maintenance, and retrieval of operational data and object storage that is required by any of the components of the system controller 210 for the purpose of physical transport and replication to and/or from one or more Distributed Storage System main and/or auxiliary sites.

In the general case of establishing and managing an account with device and/or user authorized access, while one embodiment could use an account, username, and password scheme to authenticate users and/or clients 201, the preferred embodiment described herein authenticates and secures sessions between the user and/or client 201 and client services 260 using digital credentials for authentication and privacy. Establishing an account using digital credentials for authentication and privacy includes the following: a) a customer account is establish by an external but related means that collects and validates the customer profile, contact information, services purchased, method of payment, initial payment, and other relevant information of which any or all may be subject to credit and/or background checks to validate the information and establish compliance with applicable laws; the successful result is a new account holder which is then issued a customer account number and a one-time-use personal identification number (PIN) which are transmitted separately to the responsible party for the account, b) the responsible party becomes the initial user on the account by installing the Distributed Storage System client software on a trustworthy computer in their control and establishes a network connection through the firewall and load balancer 202 to client services 260 and thus become designated as a client 201, c) the client 201 under the control of said user selects one of a plurality of means to securely generate and store a digital credential private/public key pair and a certificate signing request for the account master digital credentials; the certificate signing request may include account identifier(s); the client 201 under the control of said user issues a new account request to client services 260 by encrypting such request consisting of the account number, PIN, and certificate signing request using the Distributed Storage System new account digital credentials, attaching the account number or PIN to the request in plaintext, d) client services 260 uses the plaintext to validate that the account in question is a new uninitiated account, decrypts the request using the Distributed Storage System new account private key via the security manager 231; validates that the account number and PIN match the account records from the account, device, and user access manager 221 that were created during the account establishment; upon successful validation, presents the certificate signing request to the certificate authority 232 to issue a valid certificate for the requested account; stores the issued certificate to the account, device, and user access manager 221, revokes the validity of the used PIN, and returns the issued certificate to the client 201, e) the client 201 under the control of said user selects one of a plurality of means to securely generate and store a digital credential private/public key pair and a certificate signing request for an administrative user credential, one or more user full access digital credentials, and an in-case-of-emergency-or-death (ICED) credential; a certificate signing request is created for each credential and may include account, role, and/or other identifying information; each certificate signing request is signed by the associated master account digital credentials; the client 201 under the control of said user issues a new account certificate request to client services 260 by collecting the certificate signing requests and then encrypting the request using the Distributed Storage System new account digital credentials, f) client services 260 decrypts the request using the Distributed Storage System new account private key via the security manager 231; validates that the master account digital credentials have signed the request(s) via the security manager 231; validates that the account in question has not previously had any administrative account assigned and has no storage in use; upon successful validation, presents the certificate signing requests to the certificate authority 232 to issue a valid certificates; stores the issued certificates to the account, device, and user access manager 221; returns the issued certificates to the client 201, g) the client 201 under the control of said user selects one of a plurality of means to securely generate and store a digital credential private/public key pair and a certificate signing request for each user intermediate credential and transfer credential; a certificate signing request is created for each credential and may include account, user, role, and/or other identifying information; each certificate signing request is signed by the associated user full access credential; the client 201 under the control of said user issues a new account certificate request to client services 260 by collecting the certificate signing requests and then encrypting the request using the storage system new account digital credentials, h) client services 260 decrypts the request using the Distributed Storage System new account private key via the security manager 231; validates that valid user full access digital credentials have signed the request(s) via the security manager 231; upon successful validation, presents the certificate signing requests to the certificate authority 232 to issue valid certificates; stores the issued certificates to the account, device, and user access manager 221; returns the issued certificates to the client 201, i) the client 201 under the control of said user receives all issued certificates, protects the private keys with passphrases; the protected private keys and certificates for each digital credentials are saved, printed, archived, and prepared for distribution as noted herein for each digital credential and authentication type, and h) the client 201 under the control of said user can begin using the storage functions of the Distributed Storage System immediately or can first configure default options and settings for the account and users and establish single or multiple factor authentication and distributed keys as noted herein in order to customize the storage features and functions.

The typical use-case for digital credentials requires that the private key of such digital credentials is stored in a tamper-resistant cryptographic module for the purpose of providing the maximum assurance that the private key is not distributed or compromised by an un-authorized third party. However, a side-effect of this implementation is a) the private key is permanently lost when the tamper-resistant cryptographic module ceases to function, and b) no party can access the private key store on the tamper-resistant module for any purpose, including the legitimate purpose of moving the private key to another tamper-resistant cryptographic module before the first tamper-resistant cryptographic module experiences hardware failure. Over the lifetime of long term data storage, it is certain that a private key must be maintained over a much longer period of time than supported by known embodiments of tamper-resistant cryptographic modules. In the general case of using digital credentials for authentication and privacy for long term data storage, digital credentials must be generated, stored, used, and maintained in such as fashion as to address tamper-resistant cryptographic module limitations. In the preferred embodiment of using digital credentials for authentication and privacy for long term data storage, a plurality of digital credentials are used as described herein. The minimum set of digital credentials include, but are not limited to, account master credential, administrative user credential, a set of user digital credentials including a full access credential and a transfer credential for each user, and an in-case-of-emergency-or-death (ICED) credential. Optionally, other digital credentials that may be used for enhanced security and/or functionally include an intermediate user credential for each user.

The account master digital credential is the first credential established for the account and functions as the primary authority for all rights granted to the account. The account master digital credential is issued in the problem domain context of establishing a means to gain access to objects for tens or hundreds of years in much the same way as we expect to retrieve books or documents from library shelves that are hundreds of years in age. Therefore, the account master digital credential is expected to have an extended lifetime that could reach to hundreds of years. Several implications follow this embodied use of the account master digital credential: a) the numbers of bits in the public/private key pair are as large as possible to provide maximum theoretical security against brute-force attacks, b) the required use of the credential is be rare, c) the private key of the credential is primarily stored on printed physical media and/or a virtual representation of physical media using a means of representation that can reasonably expected to be readable for the indefinite future, e.g. printed on paper using open specification barcode representation of data that encodes industry standard certificate and private key formats, saved in a plurality of replicas, formatted in a plurality of means, and stored in a plurality of locations; the storage location and means may be primarily private and known only to select few and/or may include public locations and means such that it could be said that they are hidden in plain sight; additionally, the private key of the credential is optionally stored on one or more computing devices in a plurality of source formats using further cryptographic or other means to encrypt and/or obfuscate the key; such digital credentials are inherently multiple factor authenticated when key division, split key sharing, or split key isolating protocols are used to divide the digital credentials among multiple parties and/or multiple locations that must contribute parts of private key in order to form a whole, d) the private key of the credential is only transferred to a computer device during use and is only stored in volatile memory on the device, e) the private key is protected by a well-chosen, non-trivial, and long passphrase that is used with a symmetric algorithm to encrypt the private key for storage when said key is not in use, f) split key protocols are used when appropriate for both the encrypted private key and/or the private key passphrase to divide the protected item into n parts that are distributed to m individuals, users, and/or devices such that a significant number of the parts have to be joined together in order to form a complete and usable private key, and g) the private key of the credential and associated passphrase is configured as to facilitate its bequeathing to subsequent caretakers of the stored data. The account master digital credential is expected the following primary uses: a) in the opening moments of the account after the account master digital credential is issued by the Distributed Storage System; the initial request(s) for certificates for one or more account administrator digital credentials and one or more in-case-of-emergency-or-death credential(s) are signed by the account master digital credential; specify initial options that define the overall security and account operating conditions including allowable administrator accounts and options, allowable user accounts and options, allowable security and authentication options, account holder profile, account succession options and profiles, and other account options, b) if the account administrator credential(s) are suspected of compromise, the account master digital credential is used to sign the certificate request for new account administrator digital credential(s) to replace the compromised credential(s), c) if any credential that allows access to or decrypted of stored objects has been compromised and the responsible party decides that the risk of exposure of the stored objects is unacceptable, the account master digital credential can be used to initiate a key refresh process that will replace the object contents, folder, and name encryption keys for all objects stored on the Distributed Storage System and optionally replace any or all other digital credentials associated with the account, and d) all objects stored on the Distributed Storage System are associated with an account; such objects are encrypted with a symmetric key and that key is encrypted by the account master digital public credential with the result that the holder of the account master digital private credential can always decrypt and read the contents of all objects associated with the account.

Administrator digital credential(s) are established and replaced by the account master digital credentials and may be established with certain requirements for type of key storage and may specify that a plurality of authenticated administrative digital credentials are required to allow certain operations. An administrator digital credential is issued in the problem domain context of establishing a means to gain access to objects for tens of years. Administrator digital credential(s) are expected to be more accessible than account master digital credentials, typically used several times per year for the following primary uses: to add or remove users or access rights, authorize additional devices, make any changes to the account payment or configuration information that if not changed, would result in the deletion and/or loss of stored objects, or change all options and preferences that are not account master exclusive. Typically, administrator digital credential(s) do not have access to the stored objects, but instead manage the users and devices that store and access objects. Several implications follow this embodied use of the administrator digital credential: a) the numbers of bits in the public/private key pair are as large as possible to provide maximum theoretical security against brute-force attacks, b) the required use of the credential is to be infrequent, c) as determined by the account master digital credentials, the private key of the credential is primarily stored on printed physical media and/or a virtual representation of physical media using a means of representation that can reasonably expected to be readable for the indefinite future, e.g. printed on paper using open specification barcode representation of data that encodes industry standard certificate and private key formats, saved in a plurality of replicas, formatted in a plurality of means, and stored in a plurality of locations; the storage location and means may be primarily private and known only to select few and/or may include public locations and means such that it could be said that they are hidden in plain sight; additionally, the private key of the credential is optionally stored on one or more computing devices in a plurality of source formats using further cryptographic or other means to encrypt and/or obfuscate the key; such digital credentials are inherently multiple factor authenticated when key division, split key sharing, or split key isolating protocols are used to divide the digital credentials among multiple parties and/or multiple locations that must contribute parts of private key in order to form a whole, d) the private key of the credential is only transferred to a computer device during use and is only stored in volatile memory on the device, e) the private key is protected by a well-chosen, non-trivial, and long passphrase that is used with a symmetric algorithm to encrypt the private key for storage when said key is not in use, and f) split key protocols are used when appropriate for both the encrypted private key and/or the private key passphrase to divide the protected item into n parts that are distributed to m individuals, users, and/or devices such that a significant number of the parts have to be joined together in order to form a complete and usable private key.

A user full access digital credential is established and replaced by the account master digital credentials and/or administrator digital credentials and may be established with certain requirements for type of key storage and other limitations and options. User full access digital credentials have the ability to direct create, update, read, delete objects, change attributes on objects, and change user options as well as request tickets from client services 260 for specified operations as limited by factors that include, but are not limited to, objects, allowed action, allowed time frame, and allowed requesting device that allow other digital credentials to perform those functions on its behalf. User full access digital credentials may be used in order to install and configure the Distributed Storage System client software on additional devices. User full access digital credentials have the ability to create and manage user intermediate digital credentials and user transfer digital credentials. Several implications follow this embodied use of the user full access digital credential: a) the numbers of bits in the public/private key pair are reasonably large as possible as determined by storage device capabilities, b) the required use of the credential is to be frequent, c) the private key is protected by a well-chosen, non-trivial, and long passphrase that is used with a symmetric algorithm to encrypt the private key for storage when said key is not in use, d) as optionally determined by the account master digital credentials, the private key of the credential is stored on a single device, stored on multiple devices using split key protocols, or stored on a single device in a tamper-proof cryptographic processor, e) the private key can be backed up on printed physical media and/or a virtual representation of physical media using a means of representation that can reasonably expected to be readable for the indefinite future, e.g. printed on paper using open specification barcode representation of data that encodes industry standard certificate and private key formats, saved in a plurality of replicas, formatted in a plurality of means, and stored in a plurality of locations. A user full access digital credential may be configured to be limited to read-only access as determined by administrator digital credential users.

A user intermediate credential is established and replaced by a user full access digital credential and may be established with certain requirements for type of key storage and other limitations and options. User intermediate digital credentials are stored on a single device and are primarily used to establish a trusted session between m devices in order to facilitate key splitting protocols for the user full access digital credential. The intermediate credential may be a single or multi-use credential and typically uses protocols such as session negotiation via SSL/TLS or other mutual authentication protocols that can be implemented using a visual representation of information (see visual representation using optical communication between any two devices as described herein) on a device that can be read by the trusting device and vice versa for the superior indication of proximity between devices. Such protocols are preferably exercised in real-time but may be implemented as store-and-forward. A user full access digital credential can grant to a user intermediate credential the rights to perform certain operations on behalf of the user full access digital credential. Several implications follow this embodied use of the user intermediate digital credential: a) the numbers of bits in the public/private key pair are reasonably large as possible as determined by storage device capabilities, b) the required use of the credential is to be frequent, c) the private key may be protected by a well-chosen, non-trivial PIN or passphrase that is used with a symmetric algorithm to encrypt the private key for storage when said key is not in use, d) the private key of the credential is stored on a single device, e) the digital credentials can be routinely replaced as necessary.

A user transfer credential is established and replaced by a user full access digital credential and may be established with certain requirements for type of key storage and other limitations and options. User transfer digital credentials are stored on a single device and are primarily used to transfer requests, responses, objects, lists, and other data between the client 201 and client services 260 even if the user full access digital credentials are not authenticated at the time of transfer. The user transfer credential may be a single or multi-use credential and only authorized to access by using a ticket that has been authorized for specific operations by the user full access digital credential.

An in-case-of-emergency-or-death (ICED) digital credential(s) are optional digital credentials that are established and replaced by the account master digital credentials and may be established with certain requirements for type of key storage. An in-case-of-emergency-or-death (ICED) digital credential is issued in the problem domain context of establishing a means to gain access to objects for tens of years. In-case-of-emergency-or-death (ICED) digital credential(s) are digital credentials with full access or read-only rights that may access any information or object associated with the account and is typically used in extreme circumstances when the account holder or their subsequent representative are no longer available to process access to the objects, i.e. the in-case-of-emergency-or-death (ICED) digital credential(s) are used in the case where the account master wants to allow full access or unlimited reading of objects when m number of trusted delegates agree that the account holder's best interest is served by accessing objects. Several implications follow this embodied use of the in-case-of-emergency-or-death (ICED) digital credential: a) the numbers of bits in the public/private key pair are as large as possible to provide maximum theoretical security against brute-force attacks, b) the required use of the credential is be rare, c) the private key of the credential is primarily stored on printed physical media and/or a virtual representation of physical media using a means of representation that can reasonably expected to be readable for the indefinite future, e.g. printed on paper using open specification barcode representation of data that encodes industry standard certificate and private key formats, saved in a plurality of replicas, formatted in a plurality of means, and stored in a plurality of locations; the storage location and means may be primarily private and known only to select few and/or may include public locations and means such that it could be said that they are hidden in plain sight; additionally, the private key of the credential is optionally stored on one or more computing devices in a plurality of source formats using further cryptographic or other means to encrypt and/or obfuscate the key; such digital credentials are inherently multiple factor authenticated when key division, split key sharing, or split key isolating protocols are used to divide the digital credentials among multiple parties and/or multiple locations that must contribute parts of private key in order to form a whole, d) the private key of the credential is only transferred to a computer device during use and is only stored in volatile memory on the device, e) the private key is protected by a well-chosen, non-trivial, and long passphrase that is used with a symmetric algorithm to encrypt the private key for storage when said key is not in use, f) split key protocols are used when appropriate for both the encrypted private key and/or the private key passphrase to divide the protected item into n parts that are distributed to m individuals, users, and/or devices such that a significant number of the parts have to be joined together in order to form a complete and usable private key, g) the private key of the credential and associated passphrase is configured as to facilitate its bequeathing to subsequent caretakers of the stored data, h) said subsequent caretaker may be selected by the original account holder or nominated by key holders, and i) said subsequent caretakers may enjoy full access and ownership of the account when the owner of the account master digital credentials encrypts said account master digital credentials in a private message that can only be read by the in-case-of-emergency-or-death (ICED) digital credential holder, thus allowing the in-case-of-emergency-or-death (ICED) digital credential holder to assume the role of owner of the account master digital credentials and owner of the account. The in-case-of-emergency-or-death (ICED) digital credential may be used to make any changes to the account payment or configuration information that if not changed, would result in the deletion and/or loss of stored objects. All objects stored on the Distributed Storage System are associated with an account; such objects are encrypted with a symmetric key and that key is encrypted by the in-case-of-emergency-or-death (ICED) public digital credential with the result that the holder of the in-case-of-emergency-or-death (ICED) private credential can always decrypt and read the contents of all objects associated with the account.

As referenced herein, the term digital credentials refers to the appropriate usage of a digital certificate and/or the associated private key that is created using asymmetric cryptographic methodologies. In the most basic embodiment, digital credentials are created by using a well-known and standardized processes in which a) a first party generates a public/private key pair using asymmetric cryptographic methodologies, b) said first party uses said public/private key along with first party identifying information to create a certificate request, c) said certificate request is forwarded to a second party acting as a certificate authority that validates the certificate request and if valid, issues a digital certificate corresponding said certificate request, d) such digital certificate is forwarded to said first party, e) said digital certificate is saved to secure storage, and f) said private key that is associated with said certificate request is encrypted with a passphrase known only to said first party and said encrypted private key is saved to secure storage. The security of the resulting digital credentials depends on a) the length of the generated public/private key pair, b) the quality of pseudo-random numbers used in key generation, and c) the strength of the security used to store and access the private key. A plurality of methods and devices may be used to potentially increase the security of digital credential generation, storage, and usage such as trusted computing modules, secure virtual machines, smart cards, PKCS#11 capable devices, and split key cryptographic protocols. Digital credentials are used to perform indicated operation(s) that include a) encrypting a symmetric key with a public key contained in a digital certificate, b) decrypting a symmetric key with a private key associated with the indicated digital certificate, c) signing a hash value with a private key associated with the indicated digital certificate, and d) verifying a signature of hash value with a public key contained in a digital certificate.

As referenced herein, a key division protocol refers to the division of a symmetric encryption key or passphrase, an asymmetric encryption private key, or any secret key into n parts such that any m number of said parts can combined together to create a complete and functional reconstruction of said key. Key division is accomplished using any of a plurality of cryptographic protocols generally known as secret sharing (m,n) threshold schemes in which a secret is split into multiple unique parts n in such a manner that a) a predetermined number m of said unique parts are required in order to reconstruct the original secret, b) combing any number of said unique parts together using less than m parts does not reveal the shared secret, and c) said unique parts may be distributed to m secret holders such that an individual secret holder may hold the same or a greater amount of the shared secret than other secret holders.

As referenced herein, a split key sharing protocol refers to the performance of digital credential operations by a plurality of processing devices in which key division protocols divide a digital credential private key among said plurality of processing devices which contribute portions of said digital credential private key to a single processing device to complete said digital credential operation. In one embodiment, each of the said plurality of processing devices reconstruct the portion of said digital credential private key held by each of said processing devices and communicate the reconstructed portion of said digital credential private key to a common single processing device of the said plurality of processing devices. When said common single processing device is in possession of the result of said digital credential private key reconstructions from at least m of the said plurality of processing devices, then said common single processing device will complete said digital credential operation. Upon the completion of said digital credential operation, the said common single processing device will dispose of said reconstructed digital credential private key when it is no longer in use.

As referenced herein, a split key isolating protocol refers to the performance of digital credential operations by a plurality of processing devices in which key division protocols divide digital credential private keys and digital credential operations among said plurality of processing devices such that no one processing device at any time is in possession of the complete said digital credential private key and no one processing device is trusted to hold an entire reconstructed secret. In one embodiment, the first of the said plurality of processing devices perform a partial digital credential operation using the portion of the digital credential private key held by said first processing device and communicate the result of said partial digital credential operation to the next of the said plurality of processing devices. Such processing will continue in a serial fashion until the required number of the said plurality of processing devices have completed their isolated portion of said digital credential operation with the last said processing device containing the result of said digital credential operation.

In the general case of split key sharing protocol processing (reference FIG. 2a), a plurality of users and/or clients 271, 272, 273 participate in a given digital credential operation by independently processing and subsequently contributing some portion of said digital credential operation such that when combined with all portions of said digital credential operation that are processed by a required minimum of users and/or devices 271, 272 and contributed to the final user and/or device 273, the final user and/or device 273 can produce the result of said digital credential operation. As a security enhancement, the communication between any two said users and/or devices 271, 272, 273, may be comprised of either a) an electronic connecting network or, b) an optical communication established as single or bi-directional communication as described further below. In the general case of split key isolating protocol processing (reference FIG. 2a), a plurality of users and/or clients 281, 282, 283 participate in a given digital credential operation by independently processing and subsequently contributing some portion of said digital credential operation such that each of the plurality of users and/or devices 281, 282 completely finishes processing the portion of the digital credential operation assigned before contributing the result of said processing as the input to processing as performed by the next user and/or device 282, 283. When the minimum required number of users and/or devices 281, 282, 283 have serially contributed their results as described, the final user and/or device 283 can produce the result of said digital credential operation. As a security enhancement, the communication between any two said users and/or devices 281, 282, 283, may be comprised of either a) an electronic connecting network or, b) an optical communication established as single or bi-directional communication as described further below. As a security enhancement, methods described here for split key sharing protocol and split key isolation protocol may be combined in the processing of a digital credential operation.

Optical communication between any two devices is accomplished by a) a process on a first device creates information that needs to be conveyed to a separate second device, b) said process on a first device creates a visual representation of said information on a screen or printer under the control of the first device, c) a separate second device is equipped with a camera of sufficient resolution to accurately interpret information that is displayed or printed on said first device, d) said second device collects images as a single or multiple frame moving visual representation of the information displayed by said first device using an attached camera, e) a process on said second device interprets the collected images as one or more interpretable blocks of data and uses the interpreted data as input to said process on said second device. In the event that the process on said second device needs to communicate a response the process on said first device, said second device may take the role of the sender of information and said first device may take the role of the receiver of information. The visual representation of said information that is presented in the optical communication may be comprised of a) standard barcodes comprised of two or more colors, b) a series of standard barcodes comprised of two or more colors, c) a continuous series of standard barcodes comprised of two or more colors, d) general images, e) color bars, and f) a video or movie of barcode and images described herein. The visual representation of said information that is presented in the optical communication may have embedded sequence data that specify the order in which the visual representation of said information are to be interpreted.

As referenced herein, digital credential creation, digital credential operations, and protocols that use digital credentials may be accomplished as required by the system and account configuration by either a) single factor digital credential operations that process each step of the operation or protocol on a single device, or b) multiple factor authentication in which each step of the operation or protocol is processed on multiple devices as described by key division, split key sharing, or split key isolating protocols.

An authentication and privacy enhanced embodiment of the Distributed Storage System uses multiple factor digital credential operations in order to protect digital credential private keys from malicious or unintentional disclosure. As determined by system configuration and account configuration, multiple factor digital credentials may require a) a single user to authenticate using multiple devices, b) a single user to be authenticated by multiple users using any device, or c) a single user to be authenticated by multiple users using specified devices. Multiple factor digital credential authentication operations may use key division, split key sharing, or split key isolating protocols. As determined by system configuration and account configuration, the number and quality of successful multiple factor credential operations required for a given digital credential is determined at the point of digital credential creation when the key division protocol selects the require number of component parts of digital credential private key m that are required out of the total number of component parts of the digital credential private key in order complete a valid authentication. The sum m of said multiple factor authenticated digital credential operations may be accomplished by a combination of means including a) configuring the Distributed Storage System as an additional party to the authentication operation and/or, b) configuring a client 201 to directly authenticate with another client 201. For authentications in which the Distributed Storage System as an additional party to the authentication operation, the user operations router 222 will enable first client 201 to second client 201 communications in order to facilitate a challenge response protocol that provides proof of valid authentication by second client 201 to both the Distributed Storage System and the first client 201. For authentications in which a client 201 directly authenticates with another client 201, the second client 201 will provide proof of valid authentication by second client 201 directly to the first client 201. In any of such multiple factor authentication transactions, additional clients 201 must successfully contribute additional client 201 authentication proof to the Distributed Storage System and/or the first client 201 until a minimum of m valid authentications have been accomplished within the time frame specified by system configuration and account configuration.

The distribution storage system client software provides a security enhanced embodiment for protecting the user full access private key from malicious disclosure by an intentional or unintentional modification of the Distributed Storage System client software by a) user full access private digital credentials are stored according to a key division or split key sharing protocol on a plurality of computing devices that may include the client device 201 with each said computing device storing all or part of said user full access digital credentials, b) a second computing device is designated to use user full access private digital credentials operated in an read-only type mode and is best understood as a virtual machine or a USB bootable operating system that is refreshed periodically; such second computing device is optionally isolated from all networks, c) said second computing device designated to use user full access private credentials uses a select subset of distributed software system client software components so as to have functions accepting validated requests signed by user intermediate access digital credentials including signing requests, encrypting keys, private key and other digital credential functions, d) each of the plurality of computing devices that hold a portion of the user full access digital credential private key contribute their portion to said second computing device that is designated to use user full access credential private key in a one-way transfer that can be effected via network communication and/or visual representation of information (see visual representation using optical communication between any two devices as described herein) on a device to be interpreted by the designated device via a scan, photo, or video process in which the information is read to access the contribution, e) said second computing device designated to use user full access private credentials uses a select subset of distributed software system client software components to perform digital credential operations, f) the resultant data is transferred to the client 201 in a one-way transfer that can be effected via network communication and/or visual representation of information (see visual representation using optical communication between any two devices as described herein) on a device to be interpreted by the client 201 via a scan, photo, or video process in which the information is read to access the resultant data, and g) such transferred resultant data then enters the transaction process as if the user full access private process were performed directly on the client 201.

The distribution storage system client software provides a security enhanced embodiment for protecting the user full access private key from malicious disclosure by an intentional or unintentional modification of the Distributed Storage System client software by a) user full access private digital credentials are stored according to the split key isolating protocol on a plurality of computing devices that may include the client device 201 with each said computing device storing a portion of said user full access digital credentials, b) a second computing device is designated as the final computing device in the split key isolating protocol and is best understood as a virtual machine or a USB bootable operating system that is refreshed periodically; such second computing device is optionally isolated from all networks, c) said second computing device uses a select subset of distributed software system client software components so as to have functions accepting validated requests signed by user intermediate access digital credentials including signing requests, encrypting keys, private key and other digital credential functions, d) each of the plurality of computing devices that hold a portion of the user full access digital credential private key contribute their portion by processing the digital credential operation according to the split key isolating protocol to each next successive computing device and final to said second computing device, each communicating the result of their portion of said digital credential operation to the next device using a one-way transfer that can be effected via network communication and/or visual representation of information (see visual representation using optical communication between any two devices as described herein) on a device to be interpreted by the designated device via a scan, photo, or video process in which the information is read to access the contribution, e) said second computing device uses a select subset of distributed software system client software components to perform final digital credential operations, f) the resultant data is transferred to the client 201 in a one-way transfer that can be effected via network communication and/or visual representation of information (see visual representation using optical communication between any two devices as described herein) on a device to be interpreted by the client 201 via a scan, photo, or video process in which the information is read to access the resultant data, and g) such transferred resultant data then enters the transaction process as if the user full access private process were performed directly on the client 201.

In the general case of the transfer of objects from the client to the Distributed Storage System and back to the same or other clients, the preferred methods are as described herein. These preferred methods are described with the Microsoft Windows operating systems in mind, but those with skill in the art will recognize that the disclosed embodiments have relevance to a wide variety of operating systems. The Distributed Storage System client software accomplishes object transfers to the Distributed Storage System as follows: a) files exist on the local operating system of the client 201 in the form of common files stored in the operating system or as files stored on a local a local container-based file system exposed a mapped drive and designated to use encryption such that the files stored in the container are encrypted at rest and automatically decrypted when read into memory for use by client applications, b) such files are transferred into a separate local container-based file system that serves as a partial or complete replica of the objects stored in the Distributed Storage System, c) such transfer is made automatically using rule-based logic or manually by the user, d) as such files are transferred, the contents of the files are encrypted to a plurality of digital credentials comprising the account master digital credentials, in-case-of-emergency-or-death (ICED) digital credential, and the user full access digital credentials and then signed by the user full access digital credentials, e) any file name, metadata, or folder information that is associated with transferred or stored files is appropriately encrypted via user full access digital credentials when at rest and automatically decrypted when read into memory for use by client applications; further, a plurality of encryption keys may be used such that the encryption key for the folder structure and file name may be cryptographically shared with the user transfer digital credentials, f) after each such file is transferred into a separate local container-based file system that serves as a partial or complete replica of the objects stored in the Distributed Storage System, the client 201 requests from client services 260 a ticket using the authority of the user full access digital credentials; such ticket request contains data about the subject file including encrypted folder, file name, metadata information; such ticket designates the requested action including write or update actions and is signed under the authority of the user full access digital credentials; such ticket is presented to client services 260 via a secure session for verification of authorization and validity and subject to account and user limitations, client services 260 returns a signed ticket authorizing the requested action; such approved and signed ticket is then stored alongside the subject file and is used at the appropriate time to authorize the transfer of the subject file to the Distributed Storage System and the taking of the action designated in the ticket using the less capable user transfer digital credentials even if user full access digital credentials are not available to be validated; at some later point in time, the user transfer digital credentials will be used to transfer the subject file along with the matching ticket to or from the Distributed Storage System; at some later point in time when client services 260 receives the subject file along with a matching ticket, client services 260 will validate the ticket and if found to be valid, will take the action designated in the ticket as if the subject file had been presented to client services 260 by the user full access digital credentials that authorized the ticket, and g) upon completion of the actions authorized by the ticket, client services 260 returns the updated object/file metadata information to the client 201 protected by the user full access and/or the user transfer digital credentials as appropriate to the operation. The Distributed Storage System client software accomplishes object transfers from the Distributed Storage System as follows: a) files exist on the Distributed Storage System of which the client 201 has a partial or complete listing and replica of those files may or may not exist in the local container-based file system that serves as a partial or complete replica of the objects stored in the Distributed Storage System, b) the client 201 requests from client services 260 a ticket under the authority of the user full access digital credentials; such ticket contains data about the subject file including encrypted folder, file name, metadata information; such ticket designates the requested read action and is signed under the authority of the user full access digital credentials; such ticket is presented to client services 260 via a secure session for verification of authorization and validity and subject to account and user limitations, client services 260 returns a signed ticket authorizing the requested action; such approved and signed ticket is then stored and is used at the appropriate time to authorize the transfer of the subject file and the taking of the action designated in the ticket using the less capable user transfer digital credentials; at some later point in time, the user transfer digital credentials will be used present the approved and signed ticket to client services 260; when client services 260 receives the approved and signed ticket, client services 260 will validate the ticket and if found to be valid, will take the action designated in the ticket as if the subject file had been presented to client services 260 by the user full access digital credentials that authorized the ticket; upon completion of the actions authorized by the ticket; at some later point in time, client services 260 returns the updated object/file along with the metadata information to the client 201 protected by the user full access and/or the user transfer digital credentials as appropriate to the operation and stores the object and metadata to the local container-based file system that serves as a partial or complete replica of the objects stored in the Distributed Storage System, c) any file name, metadata, or folder information that is associated with transferred or stored files is appropriately encrypted via user full access digital credentials when at rest and automatically decrypted when read into memory for use by client applications; further, a plurality of encryption keys may be used such that the encryption key for the folder structure and file name may be cryptographically shared with the user transfer digital credentials. The Distributed Storage System client software accomplishes object deletes on the Distributed Storage System as follows: a) files or a listing of files exist on the local container-based file system that serves as a partial or complete replica of the objects stored in the Distributed Storage System, b) such files are designated for deletion under the authority of the user full access digital credentials which in the common case occurs by the Distributed Storage System client software making authorized use of the user full access digital credentials, c) after each such file is designated for deletion, the client 201 requests from client services 260 a ticket under the authority of the user full access digital credentials; such ticket contains data about the subject file including encrypted folder, file name, metadata information; such ticket designates the requested delete action and is signed under the authority of the user full access digital credentials; such ticket is presented to client services 260 via a secure session for verification of authorization and validity and subject to account and user limitations, client services 260 returns a signed ticket authorizing the requested action; such approved and signed ticket is then stored alongside the subject file and is used at the appropriate time to authorize the taking of the delete action designated in the ticket using the less capable user transfer digital credentials; at some later point in time, the user transfer digital credentials will be used to transfer the deletion ticket to or from the Distributed Storage System; when client services 260 receives the deletion ticket, client services 260 will validate the ticket and if found to be valid, will take the action designated in the ticket as if the subject file had been presented to client services 260 by the user full access digital credentials that authorized the ticket, and d) upon completion of the actions authorized by the ticket, client services 260 returns the updated object/file metadata information to the client 201 protected by the user full access and/or the user transfer digital credentials as appropriate to the operation and the client 201 completes the authorized action of deletion in the local container-based file system that serves as a partial or complete replica of the objects stored in the Distributed Storage System. The Distributed Storage System client software accomplishes status updates and folder list replication from the Distributed Storage System as follows: a) the client 201 requests from client services 260 a ticket under the authority of the user full access digital credentials; such ticket contains data about the status and/or file listing requested; such ticket designates the requested action and is signed under the authority of the user full access digital credentials; such ticket is presented to client services 260 via a secure session for verification of authorization and validity and subject to account and user limitations, client services 260 returns a signed ticket authorizing the requested action; such approved and signed ticket is then stored and is used at the appropriate time to authorize the transfer of the request information and the taking of the action designated in the ticket using the less capable user transfer digital credentials; at some later point in time, the user transfer digital credentials will be used present the approved and signed ticket to client services 260; when client services 260 receives the approved and signed ticket, client services 260 will validate the ticket and if found to be valid, will take the action designated in the ticket as if the subject file had been presented to client services 260 by the user full access digital credentials that authorized the ticket, and b) upon completion of the actions authorized by the ticket, client services 260 returns the updated information to the client 201 protected by the user full access and/or the user transfer digital credentials as appropriate to the operation and stores the information to the local container-based file system that serves as a partial or complete replica of the objects stored in the Distributed Storage System. Further to these operations, synchronization operations are supported that allow a complex combination of the operations described herein to push objects, metadata, and information from client services 260 to the client 201 with a) a standing client 201 request, or b) a proactive action that is validated by the client 201 upon receipt. Such synchronization operations allow multiple instances of the distribution storage system client software to proactively and automatically to the degree possible remain in synchronization with each other for each designated user full access digital credentials.

As a security enhancement (reference FIG. 2b), an account may be configured such that client services 260 may require at least one of a plurality of designated witness users and/or clients 293 to perform a digital credential operation that functions as a witness to the validity of objects that are to be written, updated, or deleted on a Distributed Storage System by other users and/or clients 291, 292. The purpose of said witness operation is to insure that a) the object contains valid data in order to prevent data vandalism, cheating, or destruction by allowing bad objects to be stored that unknowingly masquerade as valid objects, b) the object contains a valid filename, c) the user and/or client 291, 292 that originates the write, update, or delete operation has signed the object with valid and current digital credentials, d) the user and/or client 291, 292 that originated the write, update, or delete operation has encrypted the object with a session key that is proven valid by the witness user and/or client 293, e) that said session key that is proven to be valid is properly encrypted to the required digital credentials by the witness user and/or client 293 and said encrypted session keys are included in the object to be stored such that said required digital credentials can decrypt and access said object; examples of required digital credentials comprise account master digital credentials, in-case-of-emergency-or-death digital credentials, administrator digital credentials, other user full access user digital credentials, and other user read-only access digital credentials, f) upon validation of contents and security for said object, the witness user and/or client 293 applies its digital credential signature to said object in witness of said validation, g) the witness user and/or client 293 communicates said signed object to client services 260 of a given Distributed Storage System 294, h) the witness user and/or client 293 may communicate a replica of said signed object to an attached local storage system 295, and g) upon receipt of said object, client services 260 verifies that a witness has appropriately signed said object before allowing said object to be written, updated, or deleted on Distributed Storage System 294. FIG. 2b represents one embodiment of data flow that supports the witnessing of objects that are written, updated, or deleted. One or more users and/or clients 291, 292 originate requests for the purpose of writing, updating, or deleting objects on a given Distributed Storage System 294. When said users and/or client 291, 292 account parameters require that a witness user and/or client 293 validate object requests from said users and/or client 291, 292, the Distribution Storage System 294 routes object requests from said users and/or client 291, 292 to a witness user and/or client 293 as described herein. Only if said request for objects to be written, updated, or deleted is found to be valid, will the witness user and/or client 293 apply its digital credential signature to said object and request in witness of said validation and pass said request to the Distribution Storage System 294 for further processing. Moreover, if users and/or clients 291, 292 attempt to directly communicate objects to be written, updated, or deleted to the Distribution Storage System 294, then the Distribution Storage System 294 will reject such request because the request is not signed by a designated witness user and/or client 293. In this security embodiment, the object contents remains unknown to the Distribution Storage System 294 and the witness user and/or client 293 may exist in a trusted user designated location.

As referenced herein, the contents of objects as well as their file and folder names are encrypted with digital credentials created, controlled, maintained, and known only to the account holder and any user so designated by the account holder. As such, the Distributed Storage System at no point has any knowledge of a) any calculations or pseudo random information used in the determination of private asymmetric keys for digital credentials or symmetric keys used for object content, name, and folder information, b) any private digital credentials of the account holder or its designees, c) any encryption keys used to encrypt any object contents, or d) any encryption keys used to encrypt any object folder or file names. Therefore, the Distributed Storage System has no advantageous means of discerning the object contents or the file name and folders used to designate that object.

In the general case of establishing client access, the potential client 201, being a device and/or user, connect through the firewall and load balancer 202 to client services 260 which uses the security manager 231 to initiate a series of one or more challenge and response exchanges with the user and/or client 201 in order to a) authenticate the user and/or client 201 to the client services 260, b) authenticate the client services 260 to the user and/or client 201, c) authenticate the right of the user and/or client 201 to access a specified account, and d) establish session credentials that are used to secure and authenticate the session for a configurable time period. Client services 260 uses the account, device, and user manager 221 in order to validate account relationships and maintain said mutual authentication and sessions credentials for the length of the session. In order to increase confidence in the identity of the authenticated user and/or client, client services 260 may use additional user and/or device information associated with the account in question to establish one or more additional independent sessions with these additional users and/or devices using the user operations router 222 for the purpose of establishing that the proposed user and/or client 201 can further authenticate itself using one or more additional authentication factors via the additional communicate channel(s) and/or session(s). If the user and/or client 201 fails to provide timely authentication during any step of the process, client services 260 terminates the exchange with the user and/or client and upon repeated failed attempts, may optionally terminate the user and/or client 201 access with or without prejudice. Once a user and/or client 201 is satisfactorily authenticated, a) session credentials are negotiated between the user and/or client 201 and client services 260 and those credentials are cached by the account, device, and user manager 221 for the life of the session, b) access control lists associated with the authenticated user and/or device are made available to client services 260 to enforce any positive or negative access and/or control rights that are granted for the authenticated session, and c) usage limits including those on bandwidth and storage associated with the authenticated user and/or device are made available to client services 260 to enforce any limits imposed on the client 201 for the authenticated session. Any authenticated session credentials are permanently purged from a client services 260 instance when the user and/or client 201 has not responded to the specified client services 260 instance for a configurable length of time. Further, any authenticated session credentials are permanently purged from the account, device, and user manager 221 and all client services 260 instances when the user and/or client 201 has not responded to any specified client services 260 instances for a configurable length of time. After session credentials have been purged, the user and/or client 201 must re-establish client access as described herein before further access is allowed by client services 260. At any time while an authenticated session is active, client services 260 may transmit to the client 201 requested objects, object lists, or object metadata in fulfillment of previously requested operations.

In the general case of establishing authenticated communications between a) Distributed Storage System sites, and b) controllers, managers, and functional units within a Distributed Storage System site, each of the said sites, controllers, managers, and functional units use the security manager 231 and the controller administrator 230 to initiate a series of one or more challenge and response exchanges with other of said sites, controllers, managers, and functional units in order to a) use a plurality of means to authenticate each member to another member, b) authenticate the right of members to establish communication and the allowed functionality of said communications, and c) establish session credentials that are used to secure and authenticate the communication session for a configurable time period.

In the general case of writing objects, the authenticated user and/or client 201 sends a write operation request with object identifying parameters and write priority to client services 260 by a) transferring both the operation request and the object to write via an authenticated session on the connected network; storing the object to write in Object Storage System for operations and pending objects 212 as an encrypted object that is signed by the user and/or client 201, or b) transferring the operation request via an authenticated session on the connected network; transferring the object to write on a separate network connection; storing the object to write in Object Storage System for operations and pending objects 212 as an encrypted object that is signed by the user and/or client 201. When client services 260 receives the operation request, such request is a) validated to be allowed by any access control lists that constrain the operation, b) subjected to usage calculations including bandwidth and storage space, taking into account that such object may be an updated replacement for a previously written object, with the resulting usage data written to the account, device, and user manager 221, and c) held by the session on client services 260 while the object to write is received unless such wait time exceeds a configurable time period in which case the client services 260 queues the request to the pending operations manager 223. When both the operation request and the associated object to write are received and/or queued and verified to be correct and authorized, the controlling process of either the pending operations manager 223 or client services 260 completes the write operations request by writing the object to the Object Storage System 250, 251 and associated object metadata including the status, location, date written, and other related information to the object metadata and list manager 227. If the client 201 session with client services 260 is still active, the client 201 is notified of the result of the write operation. The pending operations manager 223 receives notification that a new or updated object has been written and creates a) a new pending operation(s) to write the object to the Distributed Storage System auxiliary site(s) 280 in the number of replicas and locations specified in the account information associated with the authenticated user and/or client 201 and b) a new pending operation to remove the object from the Object Storage System 250, 251 when all the replicas have been successfully written and a configurable minimum time period has elapsed as is specified in either the account of the authenticated user or specified as system default. When any replica write operation request to write the object to Distributed Storage System auxiliary site(s) 280 is completed, the status, location, date written, and other related information is saved locally using the object metadata and list manager 227 and cached for transmission to the client 201 during a future authenticated session, the result of which is to provide the client 201 with metadata for all stored objects indicating the most current status of such stored object such as number of replicas, stored locations, last written date, last verified date, and other information intended to convey to the client 201 the details of the object storage for data management purposes and to instill confidence in the Distributed Storage System. Any write operation that results in an update of a previously written object may designate the previously written object for deletion while allowing the object that has been designated for deletion to remain in valid storage on storage media in the Distributed Storage System FIG. 1 for an extended undefined amount of time, a configurable amount of time, or a configurable number of revisions by adding object metadata that allows the objects designated for deletion to continue to be tracked by the pending operations manager 223 in order to allow operations on such objects that include accessing, renaming, or permanently deleting that object.

In the general case of reading objects for status and/or content, the authenticated user and/or client 201 sends a read operation request with object identifying parameters and read priority to client services 260 by transferring the read operation request via an authenticated session on the connected network. When client services 260 receives the operation request, such request is a) validated to be allowed by any access control lists that constrain the operation, b) subjected to usage calculations including bandwidth and storage space with the resulting usage data written to the account, device, and user manager 221, and c) held by the session on client services 260 while the object to read is retrieved from the Object Storage System 250, 251 unless the requested object is not available to read from the Object Storage System 250, 251 in which case the client services 260 queues the read request to the pending operations manager 223, notifies the client 201 of a read pending status. If request read operation from the user and/or client 201 is authenticated and allowed, but cannot be fulfilled from the Object Storage System 250, 251, then the object will be retrieved from one of the Distributed Storage System auxiliary sites by creating a pending operation that might complete in a few minutes or could require many days. If a pending operation is required to complete the read request, the pending operations manager 223 a) retrieves the object metadata from the object metadata and list manager 227 to determine the Distributed Storage System auxiliary site(s) 280 on which the object is located, b) initiates pending read operations for the requested object from the Distributed Storage System auxiliary site(s) 280 on which the object is located, c) waits for the a successful read operation return from one Distributed Storage System auxiliary site 280, writes the read object to the Object Storage System for operations and pending objects 212, and then cancels the remaining pending read operations from said Distributed Storage System auxiliary site(s) 280, and d) the read object and/or the results of the read operation are cached for transmission to the client 201 during a future authenticated session. If the read operation is concerned only with status, the specified object will only be validated with only the status result of the read operation returned to the client 201 during any current or next future authenticated session. Any pending read operation request may be canceled at the discretion of the authenticated user and/or client 201.

In the general case of deleting objects, the authenticated user and/or client 201 sends a delete operation request with object identifying parameters to client services 260 by transferring the delete operation request via an authenticated session on the connected network. When client services 260 receives the operation request, such request is a) validated to be allowed by any access control lists that constrain the operation, b) freed storage space is calculated with the resulting usage data written to the account, device, and user manager 221, c) any replicas of the specified object are deleted from the Object Storage System 250, 251, and d) the client services 260 queues the delete request to the pending operations manager 223, notifies the user and/or client 201 of a delete pending status. The pending operations manager 223, a) retrieves the object metadata from the object metadata and list manager 227 to determine the Distributed Storage System auxiliary site(s) 280 on which the object is located, b) initiates pending delete operations for the requested object from the Distributed Storage System auxiliary site(s) 280 on which the object is located, c) waits for the a successful delete operation return from each Distributed Storage System auxiliary site 280, and d) updates the object metadata and list manager 227 after each delete operation returns. When any delete operation request is completed, the status and other related information is removed locally from the object metadata and list manager 227 and the results of the delete operation are cached for transmission to the client 201 during a future authenticated session. Any delete operation may designate an object for deletion while allowing the object that has been designated for deletion to remain in valid storage on storage media in the Distributed Storage System FIG. 1 for an extended undefined amount of time, a configurable amount of time, or a configurable number of revisions by adding object metadata that allows the objects designated for deletion to continue to be tracked by the pending operations manager 223 in order to allow operations on such objects that include accessing, renaming, or permanently deleting that object.

In the general case of data erasure protection, the Distributed Storage System account options include the following configurations for object management: a) an account may optionally save a configurable number of revisions to an object using parameters including the minimum or maximum time period between revisions, the size of the revisions, and storage available to the account, b) an account may keep a configurable number of revisions to an object after a write, update, replace, or delete operation using parameters including the minimum or maximum time period between revisions, the length of time to keep a revision after a write, update, replace, or delete operation, the size of the revisions, and storage available to the account, c) an account may keep a configurable number of copies or replicas of an object after a write, update, replace, or delete operation as determined by data retention policies specified by the system and/or user account and may delete said copies or replicas when said data retention policies allow the copy or replica to be deleted, d) an account may optionally specify a level of account activity at which point special data retention polices and options are applied, e) an account may optionally require authenticated approval from privileged users, administrators, or account masters to allow certain operations or group of operations; such operations can be related to the deleting or updating or objects or the deleting or updating of account attributes that would indirectly result in data loss including certain access control list operations and credit card or other payment operations, f) an account may optionally establish local container policies on capable devices that control functions that include the number of revisions on an object to retain, enabling remote erase, enabling storage parameters based on level of authentication, changing policies based on detected client 201 hardware changes, failed authentication attempts, or other detection of hostile behavior, and g) the system controller 210 may request that one user witness or validate the actions of another user to insure that all users are properly using the account master public digital credentials and in-case-of-emergency-or-death public digital credentials to encrypt the symmetric keys used to encrypt that particular object.

In the general case of determining the status or issuing command requests to a Distributed Storage System auxiliary site 280, the pending operations manager 223 sends an operational request with parameters and priority to the Distributed Storage System auxiliary site 280 by transferring the operational request via the connected network. The operational request is processed by the Distributed Storage System auxiliary site 280 in a manner appropriate to the request and any results of such request are transmitted to the pending operations manager 223 which in turn completes the request and supplies the results any of the functional groups of the system controller 210.

As a special case of operations, in lieu of communicating with the system controller at the Distributed Storage System main site 301, the Distributed Storage System auxiliary system controller 310 may communicate with either a) another Distributed Storage System auxiliary site or a backup passive or backup active Distributed Storage System main site.

FIG. 3 shows a block diagram illustrating Distributed Storage System auxiliary site functional components for a Distributed Storage System for long-term storage. The overall Distributed Storage System shown in FIG. 1 uses the Distributed Storage System auxiliary site 300 to store a plurality of replicas of stored objects in various locations. The Distributed Storage System auxiliary site 300 provides services to and takes direction from the system controller at the Distributed Storage System main site 301 with the purpose of storing at least one replica of selected objects from the Distributed Storage System main site to an Object Storage System 361, 362, 363, 364 for long term storage. Access to the Distributed Storage System auxiliary system controller 310 is controlled by the system controller at the Distributed Storage System main site 301. The Distributed Storage System auxiliary system controller 310 receives objects, requests for objects, and system control commands from the system controller at the Distributed Storage System main site 301. As the Distributed Storage System auxiliary system controller 310 receives objects, it utilizes its functional groups including the pending operations manager 323 and Object Storage System for pending objects and operations 312 to cache the object and create a pending write operation that ultimately results in the cached object being written to at least one of the Object Storage Systems 361, 362, 363, 364. The Distributed Storage System auxiliary site 300 is comprised of at least one system controller 310 and at least one Object Storage System 361, 362, 363, 364 and may be comprised of a plurality of system controllers 310 and a plurality of Object Storage Systems 361, 362, 363, 364.

The Distributed Storage System auxiliary system controller 310 includes, but is not limited to, the following functional groups: pending operations manager 323, duty cycle manager 324, object metadata and list manager 327, power and cooling manager 328, error and reporting manager 329, Object Storage System media manager 341, database storage system 311, Object Storage System for operations and pending objects 312, and portable Object Storage System 313. Further the Distributed Storage System auxiliary system controller 310 is network connected to and controls a plurality of Object Storage Systems 361, 362, 363, 364 that are further described in FIG. 4. The Distributed Storage System auxiliary system controller 310 provides the described functions as a logical collection of functions that may be implemented on one or more server physical and/or virtual instances that may be accessed via the system controller interface or by the interfaces of the described functionality. Any functional group of the Distributed Storage System auxiliary system controller 310 may use any or all other functional groups of the system Distributed Storage System auxiliary system controller 310, the system controller at the Distributed Storage System main site 301, or Object Storage Systems 361, 362, 363, 364 in order to provide its functionality. The system controller 310 is configured to provide physical hardware control, operating system control, application control, processing control, processing, storage, management services, and reporting services to the local storage site and limited by system configuration may also provide physical hardware control, operating system control, application control, processing control, processing, storage, management services, and reporting services for other storage sites.

The pending operations manager 323 includes functions as follows: a) creates, updates, and deletes pending operations records as they are created by various functions within the Distributed Storage System auxiliary site, b) monitors the status of pending operations and takes the appropriate actions upon the completion of a pending operation, c) provides for the management of pending operations with a plurality of steps or status changes, d) may optimize pending operations by analyzing related operations and removing redundant or unnecessary operations from the pending operations queue, e) creates error reports and implements optimal recovery for operational errors, f) uses rules that define the appropriate action(s) required by operations during the steps of the pending operation, g) uses internal and/or external services to communicate with Distributed Storage System main or auxiliary sites and external processes with reliable guaranteed messaging and object transfer as appropriate, h) creates, updates, maintains, and deletes object metadata as appropriate to reflect the status and state of pending operation steps as they are completed, and i) may provide the user status feedback on the completed operation.

The duty cycle manager 324 includes functions as follows: a) controls, configures, and maintains the power and cooling requirements and operational status of all Distributed Storage System auxiliary site 300 components, b) maintains a priority list of system components critical to operations, c) maintains the component parameters, power and cooling requirements, and operational status of all Object Storage Systems 361, 362, 363, 364 including the aggregate of the sub-components for each Object Storage System, d) contains logic to evaluate and take the appropriate action in order for best use case operation of the Distributed Storage System auxiliary site 300 as a whole and the Object Storage Systems in particular; to determine which Object Storage System(s) should be powered on and active at any given time base on the quantity and requirements of pending operations, priority of pending operations, amount of storage remaining on the Object Storage System for operations and pending objects 312, amount of storage space remaining on the subject Object Storage Systems, the amount of system exceptions and failures of the subject Object Storage Systems, the amount of time elapsed since the subject Object Storage System has been powered on, the amount of power and cooling consumed by the subject Object Storage Systems, the amount of power and cooling available for Object Storage Systems, the rate that new objects and requests are presented to the Distributed Storage System auxiliary system controller 310, the maintenance requirements for Object Storage Systems or the Distributed Storage System auxiliary site 300, availability of removable and/or offline media as required by certain Object Storage Systems, and/or the requirement for manual intervention in any process germane to the operation of subject Object Storage Systems, e) responds to authenticated commands to control the operational status of a given Object Storage System in conjunction with the power and cooling manager 328 including power-on, startup, validation, available for operations, and shutdown, and f) responds to authenticated commands to control the operational status of the any of the functional components of the Distributed Storage Systems auxiliary site 300 in conjunction with the power and cooling manager 328.

The object metadata and list manager 327 includes functions as follows: a) creates, updates, maintains, and deletes metadata information for each object stored including original filename, folder, version, creation date, last update date, storage locations, replica statistics, replica hashes, and replica verification and consistency, and b) creates, updates, maintains, and deletes relational database information for object original location folder trees and lists, object storage locations, pending operations, system wide site and node configuration, operations, power, and cooling control information, and account, device, and user information.

The power and cooling manager 328 includes functions as follows: a) aggregates and reports electrical power usage and availability, b) provides command and control for electrical power usage and availability for the purpose of efficiency, reliability, economy, optimizing renewable energy usage, operation and maintenance of uninterruptible power systems, selecting power sources based on stability and availability, enabling orderly power-on of the critical system components, enabling orderly and priority-based power-on startup and operations of system components to apply the best use-case of available electrical power, enabling site power-down in the event of catastrophic power loss, and scheduling system, site, or node orderly power-down in the event unreplaceable power loss so that the affected parts of the system are powered-down to a stable state prior to complete power loss, c) aggregates and reports cooling status, d) provides command and control for cooling systems for the purpose of efficiency, reliability, economy, optimizing cooling source usage, selecting cooling sources based on thermodynamic properties, stability and availability, enabling site power-down in the event of catastrophic cooling loss, and e) enabling power and cooling management status and functions in order to allow the duty cycle manager 324 to control startup and shutdown of Object Storage Systems 361, 362, 363, 364 while keeping the entire Distributed Storage System auxiliary site within the operational design parameters of electrical power usage and cooling load.

The error and reporting manager 329 includes functions as follows: a) presents operational status, events, warning, and alerts to the user via various interfaces including web, application, and telecommunication services, and b) allows administrative users to take action on reported events limited by user rights and operational necessary.

The Object Storage System media manager 341 includes functions to manually or automatically manage removable media that is used by an Object Storage System 361, 362, 363, 364. If any described storage operation described herein cannot complete because specific removable and/or offline media (e.g. tape, optical disk, physical media) are not available on the selected Object Storage System 361, 362, 363, 364, then the Object Storage System media manager 341 communicates with the error and reporting manager 329 and optionally the system controller at the Distributed Storage System main site 301 that particular removable or offline media is required; the media may be placed online by either manual or automatic means within the Object Storage System 361, 362, 363, 364; the Object Storage System media manager 341 is either manually or automatically notified that such media is available for usage in the Object Storage System and the pending operations manager 323 is notified that the queued operation may proceed. Upon completion of the such queued operation, the pending operations manager 323 notifies the Object Storage System media manager 341 that the removable or offline media is no longer required; the Object Storage System media manager 341 communicates with the error and reporting manager 329 and optionally the system controller at the Distributed Storage System main site 301 that particular removable or offline media is no longer required; the media may be placed offline by either manual or automatic means within the Object Storage System; the Object Storage System media manager 341 is either manually or automatically notified that such media is no longer available for usage.

The database storage system 311 includes functions typical of a relational database system and provides for databases and tables of optimized data required by any of the components of the system controller 310 and may further include clustered nodes and secure local and/or remote replication functionality to maintain data integrity and reliability.

The Object Storage System for pending objects and operations 312 includes the means for the storage, maintenance, and retrieval of operational data and object storage required by any of the components of the system controller 310 as well as the metadata for objects stored on the Distributed Storage System.

The portable Object Storage System 313 includes the means for the storage, maintenance, and retrieval of operational data and object storage that is required by any of the components of the system controller 310 for the purpose of physical transport and replication to and/or from one or more Distributed Storage System main and/or auxiliary sites.

The Distributed Storage System auxiliary site 300 may contain a one or more Object Storage System(s) 361, 362, 363, 364 each of which may be differentiated by the type(s) of physical media used for storage within a particular Object Storage System for the purpose of utilizing the most advantageous characteristics of various types of storage, e.g. one Object Storage System 361 may use an online media that is fast to read and write, but is limited in capacity and longevity and another Object Storage System 363 may use an offline media that is slow to read and write and requires manual loading of media, but provides unlimited storage capacity and excellent longevity characteristics. If such mixed configuration of media is utilized, then the pending operations manager 323 will coordinate the object storage appropriately among the various Object Storage System types.

In the general case of writing objects, the system controller at the Distributed Storage System main site 301 sends a write operation request to the Distributed Storage System auxiliary system controller 310 by a) transferring both the operation request and the object to write via the connected network, b) transferring the operation request via the connected network and the and the object to write via the physical transport of the portable Object Storage System 313 on which both the operation request and object to write are stored, or c) transferring both the operation request and the object to write via the physical transport of the portable Object Storage System 313 on which both the operation request and object to write are stored. When the Distributed Storage System auxiliary system controller 310 receives the operation request, such request is queued by the pending operations manager 323. When the Distributed Storage System auxiliary system controller 310 receives the object to write, such object is queued by the pending operations manager 323 and written to the Object Storage System for operations and pending objects 312. When both the operation request and the associated object to write are queued and verified to be correct and authorized, the pending operations manager 323 determines if such operation request represents a new object to be written or an updated object that has been previously written at the local Distributed Storage System auxiliary site 300. If the write operation request represents a new object to be written, the pending operations manager 323 queries the duty cycle manager 324 for a list of Object Storage Systems (e.g. 362) that are active and ready to store new objects; if any Object Storage Systems are ready to store new objects, then the pending operations manager 323 completes the write operations request by writing the object to the Object Storage System (e.g. 362) and associated object metadata to the object metadata and list manager 327; if no Object Storage Systems are ready to store new objects, then the pending operations manager 323 continues to queue the request until an Object Storage System is ready for writing. If the write operation request represents an update to an existing object that has been previously written, the pending operations manager 323 queries the duty cycle manager 324 for a list of Object Storage Systems (e.g. 362) that are active and ready to store new objects and queries the object metadata and list manager 327 for the object metadata to determine the previous Object Storage System (e.g. 361) on which the previously written object is stored; if any Object Storage Systems are ready to store new objects, then the pending operations manager 323 completes the write operations request by writing the object to the Object Storage System (e.g. 362) and associated object metadata to the object metadata and list manager 327; if no Object Storage Systems are ready to store new objects, then the pending operations manager 323 continues to queue the request until an Object Storage System is ready for writing; if the new Object Storage System (e.g. 362) on which the updated object is newly stored is not the same Object Storage System (e.g. 361) on which the object has been previously stored, then the pending operations manager 323 creates a new pending delete operation that will serve to remove the previously written object from the Object Storage System (e.g. 361) on which it was stored. When any write operation request is completed, the status, location, date written, and other related information is saved locally using the object metadata and list manager 327 and also transmitted to the system controller at the Distributed Storage System main site 301 to allow the related pending operation at the Distributed Storage System main site to be updated accordingly. Any write operation that results in an update of a previously written object may designate the previously written object for deletion while allowing the object that has been designated for deletion to remain in valid storage on storage media in the Distributed Storage System FIG. 1 for an extended undefined amount of time, a configurable amount of time, or a configurable number of revisions by adding object metadata that allows the objects designated for deletion to continue to be tracked by the pending operations manager 323 in order to allow operations on such objects that include accessing, renaming, or permanently deleting that object.

In the general case of reading objects for status and/or content, the system controller at the Distributed Storage System main site 301 sends a read operation request with object identifying parameters and read priority to the Distributed Storage System auxiliary system controller 310 by transferring the read operation request via the connected network. When the Distributed Storage System auxiliary system controller 310 receives the operation request, such request is queued by the pending operations manager 323. When the operation request is queued and verified to be correct and authorized, the pending operations manager 323 determines if such operation request represents an object that has been previously written at the local Distributed Storage System auxiliary site 300; the object metadata and list manager 327 is queried for the associated object metadata in order to determine which Object Storage System (e.g. 363) currently stores the object; the duty cycle manager 324 is queried to determine if the specified Object Storage System (e.g. 363) is active and ready for reading; if the specified Object Storage System is ready to read the specified object, then the pending operations manager 323 completes the read operation request by reading the specified object from the specified Object Storage System (e.g. 363) and writing that object to the Object Storage System for operations and pending objects 312; if the specified Object Storage System is not ready to serve read requests, then the pending operations manager 323 continues to queue the request until the specified Object Storage System is ready for reading. When any read operation request is completed, the updated status and available transport means of the read operation request is transmitted to the system controller at the Distributed Storage System main site 301; if the system controller at the Distributed Storage System main site 301 determines that the requested object is still required, then the Distributed Storage System auxiliary system controller 310 transfers the specific object that has been read from the Object Storage System for operations and pending objects 312 to a) the system controller at the Distributed Storage System main site 301 or b) the portable Object Storage System 313 which will be subsequently physically transported to the distributed Object Storage System main site where the read operation will be completed by the system controller at the Distributed Storage System main site 301. If the read operation is concerned only with status, the specified object will only be validated with only the status result of the read operation returned to the system controller at the Distributed Storage System main site 301. Any read operation request may be canceled by the system controller at the Distributed Storage System main site 301 because either a) the user cancels such request or b) another Distributed Storage System auxiliary site has completed the read request.

In the general case of deleting objects, the system controller at the Distributed Storage System main site 301 sends a delete operation request with object identifying parameters to the Distributed Storage System auxiliary system controller 310 by transferring the delete operation request via the connected network. When the Distributed Storage System auxiliary system controller 310 receives the operation request, such request is queued by the pending operations manager 323. When the operation request is queued and verified to be correct and authorized, the pending operations manager 323 determines if such operation request represents an object that has been previously written at the local Distributed Storage System auxiliary site 300; the object metadata and list manager 327 is queried for the associated object metadata in order to determine which Object Storage System (e.g. 361) currently stores the object; the duty cycle manager 324 is queried to determine if the specified Object Storage System (e.g. 361) is active and ready for deleting; if the specified Object Storage System is ready to delete the specified object, then the pending operations manager 323 completes the delete operation request by deleting the specified object from the specified Object Storage System (e.g. 361); if the specified Object Storage System is not ready to serve delete requests, then the pending operations manager 323 continues to queue the request until the specified Object Storage System is ready for deleting. When any delete operation request is completed, the status and other related information is removed locally from the object metadata and list manager 327 and optionally transmitted to the system controller at the Distributed Storage System main site 301 to allow the related pending operation at the Distributed Storage System main site to be updated accordingly. Any delete operation may designate an object for deletion while allowing the object that has been designated for deletion to remain in valid storage on storage media in the Distributed Storage System FIG. 1 for an extended undefined amount of time, a configurable amount of time, or a configurable number of revisions by adding object metadata that allows the objects designated for deletion to continue to be tracked by the pending operations manager 323 in order to allow operations on such objects that include accessing, renaming, or permanently deleting that object In the general case of determining the status or issuing command requests by the system controller at the Distributed Storage System main site 301 to the Distributed Storage System auxiliary system controller 310, the system controller at the Distributed Storage System main site 301 sends an operational request with parameters and priority to the Distributed Storage System auxiliary system controller 310 by transferring the operational request via the connected network. When the Distributed Storage System auxiliary system controller 310 receives the operational request, such request is queued by the pending operations manager 323. When the operational request is queued and verified to be correct and authorized, the pending operations manager 323 uses the any and/or all of the functional groups of the Distributed Storage System auxiliary system controller 310 to fulfill the request or complete the action. When any such operational request is completed, the status and other parameters requested are transmitted to the system controller at the Distributed Storage System main site 301 to allow the related pending operation at the Distributed Storage System main site to be updated accordingly.

As a special case of operations, in lieu of communicating with the system controller at the Distributed Storage System main site 301, the Distributed Storage System auxiliary system controller 310 may communicate with another Distributed Storage System auxiliary site or a Distributed Storage System main site.

Embodiments of the disclosed Distributed Storage System auxiliary site 300 include Object Storage Systems 361,

362, 363, 364 that are configured to implement the effective equivalence of duty-cycle operations using the duty cycle manager 324 wherein the Object Storage System is powered on for a limited period of time during which reads, additions, updates, deletions, maintenance, file-consistency checking, and replication operations are performed. In practice, various object, maintenance, and command operations are directed toward a particular Object Storage System in a powered-off state. Operational requirements such as number and importance of queued operations and the time since last powered on play a role in determining when a particular Object Storage System 361, 362, 363, 364 is powered on to complete pending operations. Object Storage Systems 361, 362, 363, 364 that are selected for active operations are powered on and prepared for use by performing error and consistency checks as well as any required replication or maintenance operations. When the Object Storage System 361, 362, 363, 364 completes these startup and maintenance procedures, the Object Storage System 361, 362, 363, 364 responds to system requests such as reads, additions, updates, deletions, maintenance, object-consistency checking, and replication operations. After the performance of these and any other necessary operations, the Object Storage System 361, 362, 363, 364 is powered off in an orderly fashion until the next point in time that operational requirements demand that the system is powered on for a similar use. The portions of any such Object Storage System 361, 362, 363, 364 that use off-line storage mechanisms such as tape, optical media, or printed media may have long-duty cycles as determined by usage requirements.

The design of the disclosed Distributed Storage System auxiliary site 300 allows it to function well in a plurality of types of environments including urban, commercial, residential, rural, data center, subsurface, and extremely remote and/or mostly inaccessible locations. The power and cooling requirements Distributed Storage System auxiliary site 300 are modest because a minimum of number of Object Storage System(s) 361, 362, 363, 364 are powered on at any given time, e.g. a Distributed Storage System auxiliary site 300 may contain hundreds of Object Storage Systems but only functions with a few of those Object Storage Systems powered on at any given time. Since one of the core functions of Distributed Storage System auxiliary site 300 is to gracefully power-on and power-down systems, a Distributed Storage System auxiliary site 300 power system may function only using appropriate redundant UPS system(s) and may avoid the site complexities of backup power generation. Because a Distributed Storage System auxiliary site 300 can function in either online, store and forward, or combination of online and store and forward methodologies, the network requirements for a Distributed Storage System auxiliary site 300 can be very limited or very expansive and can be adapted to the installed environment. Additionally, the Distributed Storage System auxiliary site 300 is designed to fail and degrade gracefully, allowing a Distributed Storage System auxiliary site 300 to continue operations in most circumstances with very little physical onsite maintenance, thus a) remote or inaccessible Distributed Storage System auxiliary site(s) 300 may be commonly used, b) human intervention is only occasionally required reducing staffing needs, and c) failures that are not graceful can be accommodated as resources are available. All these factors combine together to create an advantageous system deployment that is practical and useful for locations that would not be well suited to typical data center deployments, thus having the potential to significantly increase location options and instances, security, redundancy, and system resilience while simultaneously significantly decreasing infrastructure, regulatory, power, cooling, construction, operation, and labor costs.

FIG. 4 shows a block diagram illustrating Object Storage System 400 functional components. The diagram illustrates an Object Storage System (OSS) 400 typical of industry embodiments such as Amazon S3 or OpenStack Swift and is used for the purpose of storing valid replicas of objects. Such an Object Storage System 400 serves the role of storing objects in the Distributed Storage System for various purposes such as those illustrated by FIG. 2 Object Storage Systems 212, 250, 251 and FIG. 3 Object Storage Systems 312, 361, 362, 363, 364. The basic functional components of such a system are a) web service interface nodes 401, 402, 403 that provide interoperable REST or other web based services for the purpose of exposing the functionality of the Object Storage System to those processes and/or users that would request services from the Object Storage System; such web service node(s) have a public interface to provide services to callers and are connected to internal private network(s) that connects the other functional components of the Object Storage System, b) storage access nodes 410, 411, 412 that create and maintain object storage maps that such nodes use to read, write, delete, and otherwise maintain objects storage on object storage nodes 421, 422, 423, 424, 425, 426; such nodes are connected to internal private network(s), c) Object Storage System administrator 413 that configures, monitors, and maintains the Object Storage System; such nodes are connected to internal private network(s), and d) object storage node(s) 421, 422, 423, 424, 425, 426 that actually storage the replicas of the objects committed to the Object Storage System; such nodes are connected to internal private network(s). This diagram illustrates the basic functional component of a typical Object Storage System in order to emphasize the role of the object storage node(s) 421, 422, 423, 424, 425, 426 acting in non-typical fashion that use a plurality of types of both online and offline storage media in order to physically store objects. The characteristics of such storage media used by object storage node(s) 421, 422, 423, 424, 425, 426 including online or offline, read speed, write speed, ability to update, and time period for optimal verification will determine the overall usage of the Object Storage System 400 and how it is used in the context of the Distributed Storage System. The details of various types of object storage device physical storage media used the in the context of object storage node(s) 421, 422, 423, 424, 425, 426 is discussed in FIG. 5. In our preferred embodiment, each Object Storage System 400 may be configured with object storage node(s) 421, 422, 423, 424, 425, 426 that contain a uniform type of object storage device physical media or a plurality of types of object storage device physical storage media in order to achieve a variety of storage purposes.

FIG. 5 shows a block diagram illustrating object storage node 500 functional components with optional storage types. The diagram illustrates an object storage node 500 typical of industry embodiments such as in OpenStack Swift and is used for the purpose of storing valid replicas of objects. Such an object storage node 500 serves the role of storing objects in the Object Storage System as illustrated by FIG. 4, object storage node(s) 421, 422, 423, 424, 425, 426 Object Storage System(s). The basic functional components of such a system are a) object storage node compute instance 501 that provides the computation and storage access functions that result in read, write, delete, verify, repair, and maintenance of objects on object storage device physical storage media; such nodes are connected to internal private network(s) that connects the other functional components of the Object Storage System FIG. 4, b) bus and/or secure network connections to one or more type and instance of storage device 510 provides the link connection between the object storage node compute instance 501 and a plurality of object storage device(s) 511, 512, 513, 514, 515, 516, and c) object storage device(s) 511, 512, 513, 514, 515, 516 that provide physical storage of content using a plurality of types of both online and offline storage. The characteristics of such storage media used by object storage node 500 including online or offline, read speed, write speed, ability to update, and time period for optimal verification will determine the overall usage of the object storage node 500 and how it is used in the context of an Object Storage System FIG. 4. The object storage node 500 may contain uniform or mixed type of object storage device(s) 511, 512, 513, 514, 515, 516 that are configured to function with the installed operating system of the object storage node 500, the functional units of the Object Storage System FIG. 4, the functional units of the distributed object system auxiliary site FIG. 3, and the functional units of the distributed object system main site FIG. 2. Types of object storage devices include a) an object storage device: hard disk 511 that uses spinning platter based hard disks as a recording medium configured in a plurality of means in accordance with their use in the object storage node 500, b) an object storage device: solid state disk 512 that uses solid state memory hard disk as a recording medium configured in a plurality of means in accordance with their use in the object storage node 500, c) an object storage device: linear tape file system 513 that uses linear tape file system(s) with removable magnetic tapes as a recording medium configured in a plurality of means including manual and automatic loading, unloading, filing, and retrieving of tapes in accordance with their use in the object storage node 500, d) an object storage device: optical disk 514 that uses optical disk system(s) with removable optical disks as a recording medium configured in a plurality of means including manual and automatic loading, unloading, filing, and retrieving of disks in accordance with their use in the object storage node 500, e) an object storage virtual device: printed/burned to physical media 515 that may use a plurality of devices to print, burn, etch, lase, chisel, or otherwise durably mark the surface of a physical object with a encoded embodiment (e.g. barcode) of the object contents to be stored; such physical materials that are durably marked include, but are not limited to, paper, metal, plastic, stone, cement, glass, semiconductor, nanotubes, and nanomaterials; such physical materials are manually or automatically loaded and unloaded from the marking device; marked physical materials are indexed, catalogued, and stored in such a manner that specific items may be manually or automatically managed by the Distributed Storage System auxiliary site FIG. 3 Object Storage System media manager 341, and f) an object storage device: external Object Storage System 516 that uses external third-party Object Storage Systems as a recording medium configured in a plurality of means in accordance with their use in the object storage node 500; such external third-party Object Storage Systems are accessed using a secure means; any objects stored on any such third-party Object Storage Systems are stored in with appropriate security and identification equivalent to that used in the Distributed Storage System; from the perspective of the account holder, the configuration of any such third-party Object Storage Systems may be such that an account holder could retrieve stored objects even if the Distributed Storage System that placed the objects becomes non-functional or ceases to exists. Removable media that is used in an object storage device 511, 512, 513, 514, 515 is physically stored in a stable environment conducive to long term storage and retrieval.

Although example diagrams to implement the elements of the disclosed subject matter have been provided, one skilled in the art, using this disclosure, could develop additional embodiments to practice the disclosed subject matter and each is intended to be included herein.

In addition to the above described embodiments, those skilled in the art will appreciate that this disclosure has application in a variety of arts and situations and this disclosure is intended to include the same.

What is claimed is:

1. A system for facilitating efficient long-term data storage system, the system comprising:
  at least one storage site, the at least one storage site comprising:
    one or more processing devices; and
    a non-transitory computer readable storage medium storing program instructions that are executed by the one or more processing devices, causing the one or more processing devices to implement the following:
    a storage delegate configured to:
      receive a data object from a first at least one of a user or a client;
      store the data object associated with the first at least one of a user or a client on one or more of a plurality of data storage nodes, and
    a site control application configured to:
      receive a request from the storage delegate to authenticate the storage delegate request;
      associate the storage delegate request with the first at least one of a user or a client;
      route the storage delegate request and data object to a second at least one of a user or client to be validated;
      receive the storage delegate request and data object from the second at least one of a user or client and authenticate the validation by the second at least one of a user or client;
      queue operational requests for data object management;
      manage operational request queues granting ordered continuity for requests, and
    wherein the second at least one of a user or client is further configured to:
      discover an encryption key that is associated with the data object;
      read the contents of the storage delegate request and the data object with any encryption removed;
      authenticate that the storage delegate request and the data object is valid and contains proof of origination by the first at least one of a user or client;
      augment the data object by writing the encryption key to the data object in such a manner that the encryption key can only be discovered by other users and/or clients that by policy should be privy to the data object; and
      apply proof of validation to the data object by the second at least one of a user or client.

2. The system of claim 1 wherein the at least one storage site is configured to store the data objects using on-line, near-line, or off-line data storage nodes.

3. The system of claim 1 wherein the at least one storage site is configured to provide rule-based replication, location selection, and data storage node media selection.

4. The system of claim 1 wherein the at least one storage site provides at least one web service, command line, or custom protocol access point that allow at least one of the user or the client to access and manage the data objects.

5. The system of claim 1 wherein the site control application of the at least one storage site is further configured to provide services that allow authorized the at least one of the user or the client to manage the data objects in a manner constrained by account parameters, the account parameters comprising at least one of the following: storage limits, bandwidth limits, authorized user, authorized device, user geographical location, user authentication level, or user access rights.

6. The system of claim 1 wherein the site control application of the at least one storage site is further configured to:
collect operational data from the one or more processing devices that comprise the at least one storage site;
control the powered state of the one or more processing devices that comprise the at least one storage site; and
control the powered state of the data storage nodes included in the at least one storage site such that each data storage node is either active for reading and writing, active for reading, powered on in standby waiting to be made active, powered on for consistency verification and repair, or powered down.

7. The system of claim 1 wherein the site control application of the at least one storage site is further configured to provide storage operation functionality for the data objects, the object storage operation functionality comprising at least one of the following operations: write, read, delete, update, replace, validate, cache, route, or transfer.

8. The system of claim 1 wherein the first at least one of a user or a client selects the desired types of storage media utilized by the data storage nodes that are utilized to store the data objects.

9. The system of claim 1, wherein the stored data objects are encrypted under the control of the first at least one of a user or a client such that encryption is performed by one or more authorized server or client devices in which the authorized server or the client devices are isolated from or connected to other networked devices.

10. The system of claim 1, wherein the first at least one of a user or a client is reliably authenticated as an authorized user of the at least one storage site using single or multiple factor authentication protocols as a precondition for accessing and managing the data objects.

11. The system of claim 1, wherein a device is reliably authenticated as an authorized device of the at least one storage site using single or multiple factor authentication protocols as a precondition for accessing and managing the data objects.

12. The system of claim 1, wherein a first user bequeaths the rights of access and/or ownership of the data objects to at least one second user thereby granting the at least one second user access to and management of the data objects according to policies established by the first user in the event that the first user encounters emergency, disaster, death, or other unusual circumstance which temporarily or permanently prevent the first user from gaining access to the data objects.

13. The system of claim 1, wherein the at least one storage site is comprised of data storage nodes that provide data storage using a plurality of types of data storage functionality that comprises spinning-platter hard disk drives, solid state storage devices, linear tape file systems with removable magnetic tapes, optical disk systems with removable optical disks, third-party object storage systems, or a device that prints, burns, lases, etches, chisels, or otherwise durably marks the surface of a physical object with a human-readable or machine-readable embodiment of the stored data object, the physical objects comprised of paper, metal, plastic, stone, cement, glass, semiconductor, nanotubes, or nanomaterials.

14. A computer implemented method for facilitating efficient long-term data storage system, the method comprising:
providing at least one storage site, the at least one storage site comprising:
a storage delegate:
receiving a data object from a first at least one of a user or a client;
storing the data object associated with the first at least one of a user or a client on one or more of a plurality of data storage nodes, and
a site control application:
receiving a request from the storage delegate to authenticate the storage delegate request;
associating the storage delegate request with the first at least one of a user or a client;
routing the storage delegate request and data object to a second at least one of a user or client to be validated;
receiving the storage delegate request and data object from the second at least one of a user or client and authenticating the validation by the second at least one of a user or client;
queuing operational requests for data object management;
managing operational request queues granting ordered continuity for requests, and
wherein the second at least one of a user or client is further:
discovering an encryption key that is associated with the data object;
reading the contents of the storage delegate request and the data object with any encryption removed;
authenticating that the storage delegate request and the data object is valid and contains proof of origination by the first at least one of a user or client;
augmenting the data object by writing the encryption key to the data object in such a manner that the encryption key can only be discovered by other users and/or clients that by policy should be privy to the data object; and
applying proof of validation to the data object by the second at least one of a user or client.

15. The method of claim 14 wherein the at least one storage site is configured to store the data objects using on-line, near-line, or off-line data storage nodes.

16. The method of claim 14 wherein the at least one storage site is configured to provide rule-based replication, location selection, and data storage node media selection.

17. The method of claim 14 wherein the at least one storage site provides at least one web service, command line, or custom protocol access point that allow at least one of the user or the client to access and manage the data objects.

18. The method of claim 14 wherein the site control application of the at least one storage site is further providing services that allow authorized the at least one of the user or the client to manage the data objects in a manner constrained by account parameters, the account parameters comprising at least one of the following: storage limits, bandwidth limits, authorized user, authorized device, user geographical location, user authentication level, or user access rights.

19. The method of claim 14 wherein the site control application of the at least one storage site is further:
   collecting operational data from the one or more processing devices that comprise the at least one storage site;
   controlling the powered state of the one or more processing devices that comprise the at least one storage site; and
   controlling the powered state of the data storage nodes included in the at least one storage site such that each data storage node is either active for reading and writing, active for reading, powered on in standby waiting to be made active, powered on for consistency verification and repair, or powered down.

20. The method of claim 14 wherein the site control application of the at least one storage site is further providing storage operation functionality for the data objects, the object storage operation functionality comprising at least one of the following operations: write, read, delete, update, replace, validate, cache, route, or transfer.

21. The method of claim 14 wherein the first at least one of a user or a client selects the desired types of storage media utilized by the data storage nodes that are utilized to store the data objects.

22. The method of claim 14, wherein the stored data objects are encrypted under the control of the first at least one of a user or a client such that encryption is performed by one or more authorized server or client devices in which the authorized server or the client devices are isolated from or connected to other networked devices.

23. The method of claim 14, wherein the first at least one of a user or a client is reliably authenticated as an authorized user of the at least one storage site using single or multiple factor authentication protocols as a precondition for accessing and managing the data objects.

24. The method of claim 14, wherein a device is reliably authenticated as an authorized device of the at least one storage site using single or multiple factor authentication protocols as a precondition for accessing and managing the data objects.

25. The method of claim 14, wherein a first user bequeaths the rights of access and/or ownership of the data objects to at least one second user thereby granting the at least one second user access to and management of the data objects according to policies established by the first user in the event that the first user encounters emergency, disaster, death, or other unusual circumstance which temporarily or permanently prevent the first user from gaining access to the data objects.

26. The method of claim 14, wherein the at least one first storage site is comprised of data storage nodes that provide data storage using a plurality of types of data storage functionality that comprises spinning-platter hard disk drives, solid state storage devices, linear tape file systems with removable magnetic tapes, optical disk systems with removable optical disks, third-party object storage systems, or a device that prints, burns, lases, etches, chisels, or otherwise durably marks the surface of a physical object with a human-readable or machine-readable embodiment of the stored data object, the physical objects comprised of paper, metal, plastic, stone, cement, glass, semiconductor, or nanotubes, or nanomaterials.

* * * * *